US007323045B2

(12) United States Patent
Hanmura et al.

(10) Patent No.: US 7,323,045 B2
(45) Date of Patent: *Jan. 29, 2008

(54) MAGENTA INK COMPOSITION

(75) Inventors: Masahiro Hanmura, Nagano-ken (JP); Kazuhiko Kitamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 10/951,446

(22) Filed: Sep. 28, 2004

(65) Prior Publication Data

US 2005/0115459 A1    Jun. 2, 2005

(30) Foreign Application Priority Data

Sep. 30, 2003  (JP) .............................. 2003-340509
Sep. 30, 2003  (JP) .............................. 2003-340510

(51) Int. Cl.
*C09D 11/00*   (2006.01)
*C09D 11/02*   (2006.01)
*B41J 2/01*    (2006.01)
*B41M 5/00*    (2006.01)

(52) U.S. Cl. .............................. 106/31.47; 106/31.48; 106/31.51; 106/31.58; 106/31.77; 106/31.78; 106/31.8; 106/31.86; 347/100; 428/195.1

(58) Field of Classification Search ............. 106/31.47, 106/31.48, 31.51, 31.58, 31.77, 31.78, 31.8, 106/31.86; 347/100; 428/195.1
See application file for complete search history.

(56) References Cited

U.S. PATENT DOCUMENTS

| 5,713,992 | A  | * | 2/1998 | Satoh et al. ............. 106/31.48 |
| 6,852,154 | B2 | * | 2/2005 | Kitamura et al. ........ 106/31.47 |
| 6,929,361 | B2 | * | 8/2005 | Matsumoto et al. ....... 347/100 |
| 6,984,032 | B2 | * | 1/2006 | Kitamura et al. ........... 347/100 |

(Continued)

FOREIGN PATENT DOCUMENTS

JP          7-90211        4/1995

(Continued)

OTHER PUBLICATIONS

Patent Abstracts of Japan of 2003-231835 dated Aug. 19, 2003 and JPO English Computer-Generated Translation.

(Continued)

*Primary Examiner*—Helene Klemanski
(74) *Attorney, Agent, or Firm*—Ladas and Parry LLP

(57) ABSTRACT

Objects of the present invention are to provide a magenta ink composition having good light-fastness and gas resistance, and excellent moisture resistance and clogging resistance, and to provide a magenta ink composition having excellent colorability in addition to these characteristics. The present invention provides a magenta ink composition containing, as colorants, at least one selected from compounds represented by undermentioned formula (1) and salts thereof, and at least one selected from compounds represented by undermentioned formula (2) and salts thereof. Moreover, the present invention also provides a magenta ink composition containing, as colorants, the above and in addition at least one selected from compounds represented by undermentioned formula (3). (Definitions of the symbols in the formulae are as in the claims.)

22 Claims, No Drawings

U.S. PATENT DOCUMENTS

| | | | |
|---|---|---|---|
| 7,015,327 B2 * | 3/2006 | Matsumoto et al. | 546/76 |
| 7,211,132 B2 * | 5/2007 | Oki et al. | 106/31.47 |
| 2005/0115458 A1 * | 6/2005 | Oki et al. | 106/31.47 |

FOREIGN PATENT DOCUMENTS

| | | |
|---|---|---|
| JP | 2000-290559 | 10/2000 |
| JP | 2001-288392 | 10/2001 |
| JP | 2002-332419 | 11/2002 |
| JP | 2002-371079 | 12/2002 |
| JP | 2003-192930 | 7/2003 |
| JP | 2003-231835 | 8/2003 |

OTHER PUBLICATIONS

Patent Abstracts of Japan of 2003-192930 dated Jul. 9, 2003 and JPO English Computer-Generated Translation.

Patent Abstracts of Japan of JP 7-90211 dated Apr. 4, 1995 and JPO English Computer-Generated Translation.

Patent Abstracts of Japan of JP 2002-332419 dated Nov. 22, 2002 and JPO English Computer-Generated Translation.

Patent Abstracts of Japan of JP 2002-371079 dated Dec. 26, 2002 and JPO English Computer-Generated Translation.

Patent Abstracts of Japan of JP 2001-288392 dated Oct. 16, 2001 and JPO English Computer-Generated Translation.

Patent Abstracts of Japan of JP 2000-290559 dated Oct. 17, 2000 and JPO English Computer-Generated Translation.

* cited by examiner

MAGENTA INK COMPOSITION

BACKGROUND

The present invention relates to a magenta ink composition (this term includes both a dark magenta ink composition and a light magenta ink composition) suitable for ink jet recording.

In recent years, an ink jet recording method has attracted attention. The ink jet recording method is a printing method in which printing is carried out by making small drops of an ink composition fly onto and thus become attached to a recording medium such as paper. This method has the distinctive characteristic that high-quality high-resolution images can be printed at high speed using a relatively inexpensive apparatus. Ink jet recording apparatuses using this method have found wide commercial acceptance due to good print quality, low cost, relatively quiet operation, and ability to form graphics. Among ink jet recording apparatuses, thermal (bubble jet (registered trademark)) and piezoelectric drop-on-demand printers have been especially successful on the market, and have come to be widely used as printers for personal computers in offices and households.

These days, formation of color images is carried out by preparing a plurality of color ink compositions and carrying out ink jet recording. In general, color images are formed using ink compositions of three colors, i.e. a yellow ink composition, a magenta ink composition and a cyan ink composition, or in some cases four colors, with a black ink composition added. Furthermore, color images may also be formed using ink compositions of six colors, with a light cyan ink composition and a light magenta ink composition added to the above four colors, or seven colors, with a dark yellow ink composition further added. The ink compositions used in such formation of color images are each required to have good colorability themselves, and in addition when a plurality of the ink compositions are combined, it is required to able to produce good intermediate colors, printed articles are required not to discolor or fade during subsequent storage, and so on.

Moreover, in recent years, through continual improvements in all of heads, ink compositions, recording methods and media, 'photographic image quality' printing using color ink jet printers has reached a level that stands comparison with 'silver salt photography', and the image quality has reached 'photograph-equivalent'. On the other hand, with regard to the storability of obtained images, attempts have been made to improve the characteristics through improving ink compositions and media. In particular, with regard to light-fastness, the characteristics have been improved to a level at which there is no longer a problem in terms of practical use (see Japanese Patent Application Laid-open No. 2000-290559, Japanese Patent Application Laid-open No. 2001-288392). However, things are still not on a par with silver salt photography. When evaluating light-fastness, it is standard for judgement to be carried out using as an index the fading rate for pure color patterns (optical density around 1.0) for each of yellow, magenta and cyan. Upon judging the light-fastnesses of ink compositions loaded into printers currently sold on the market using this evaluation method, it is often the case that the light-fastness is lowest for the magenta ink composition, and hence the magenta ink composition determines the light-fast lifetime for the ink set as a whole. Improving the light-fastness of the magenta ink composition would thus lead to an improvement in the light-fastness of photographic images and a lengthening of the light-fast lifetime for the ink set as a whole.

Moreover, printed articles produced using ink compositions as described above are placed of course indoors and also sometimes outdoors, and hence are exposed to sunlight and various other types of light and also the outside air (ozone, nitrogen oxides, sulfur oxides, etc.); ink compositions having excellent light-fastness and gas resistance are thus being developed. The characteristics of light-fastness and gas resistance are greatly influenced by the colorants in the inks, and hence there are calls for the development of magenta ink compositions that are excellent in terms of these characteristics, and also moisture resistance.

As colorants having excellent light-fastness and gas resistance out of the above characteristics, compounds (azo dyes) described in Japanese Patent Application Laid-open No. 2002-371079, and compounds (anthrapyridone dyes) described in Japanese Patent Application Laid-open No. 2002-332419 have been proposed.

Moreover, with an ink set containing a light magenta ink as described above, by including two magenta ink compositions of different color densities, it has become possible to obtain images with no graininess. With regard to such ink sets containing two ink compositions having different color densities in this way, which are principally for printing photographic images, in general it is often the case that the ink composition having a low color density is used to alleviate/eliminate graininess when forming photographic images. Moreover, when evaluating the light-fastness as described above, a pattern having an optical density of around 1.0 is formed with the ink composition having a low color density. Improving the light-fastness of the light magenta ink composition thus again leads to an improvement in the light-fastness of photographic images and a lengthening of the light-fast lifetime for the ink set as a whole. With an ink composition having a low color density, compared with an ink composition having a high color density, not such high colorability is required, and hence other characteristics such as the light-fastness become important.

SUMMARY

It is a first object of the present invention to solve the above problems, and provide a magenta ink composition (this term includes both a dark magenta ink composition and a light magenta ink composition) having good light-fastness and gas resistance, and excellent moisture resistance and clogging resistance.

Moreover, it is a second object of the present invention to solve the above problems, and provide a magenta ink composition having good light-fastness and gas resistance, and excellent moisture resistance, colorability and clogging resistance.

The present inventors have discovered that the above problems can be solved by adopting the constitution of 1 below, thus attaining the above first object.

1. A magenta ink composition of the present invention contains, as colorants, at least one selected from compounds represented by undermentioned formula (1) and salts thereof, and at least one selected from compounds represented by undermentioned formula (2) and salts thereof.

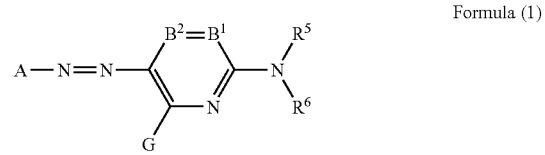

Formula (1)

(In formula (1), A represents a residue of a 5-membered heterocyclic diazo component $A\text{-}NH_2$; $B^1$ and $B^2$ represent $-CR^1=$ and $-CR^2=$ respectively, or one thereof represents a nitrogen atom and the other thereof represents $-CR^1=$ or $-CR^2=$; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, each group being optionally substituted; G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkyl group-, aryl group-, or heterocyclic group-substituted amino group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, each group being optionally substituted; and $R^1$ and $R^5$, or $R^5$ and $R^6$ may be bonded together to form a 5- or 6-membered ring.)

salts thereof, at least one selected from compounds represented by above-mentioned formula (2) and salts thereof, and at least one selected from compounds represented by undermentioned formula (3).

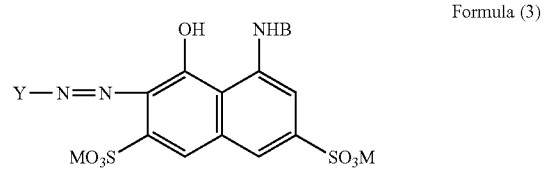

Formula (3)

[In formula (3), Y represents a phenyl group or naphthyl group substituted with a $C_1$ to $C_4$ alkyl group or alkoxy group, OH, $SO_3H$ or COOM; B represents H, or the following formula

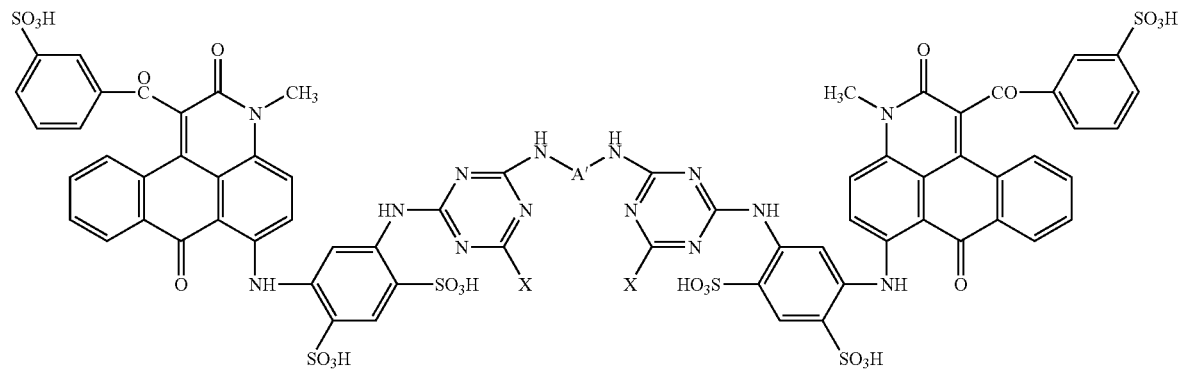

Formula (2)

(In formula (2), A' represents an alkylene group, a phenylene group-containing alkylene group, or

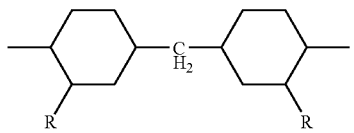

(wherein R represents a hydrogen atom or an alkyl group), and X represents $NH_2$, OH or Cl.)

Moreover, the present inventors have discovered that the above problems can be solved by adopting the constitution of 2 below, thus attaining the above second object.

2. A magenta ink composition of the present invention contains, as colorants, at least one selected from compounds represented by above-mentioned formulae (1) and

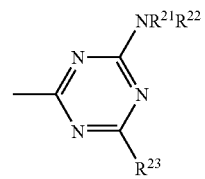

(here, $R^{21}$ represents H or a $C_1$ to $C_4$ alkyl group substituted with OH or COOH, $R^{22}$ represents a $C_1$ to $C_4$ alkyl group or phenyl group substituted with OH, $OCH_3$, $OC_2H_5$, $SO_3M$, or COOM, $R^{23}$ represents OH, COOH, or $NHR^{24}$, and $R^{24}$ represents a $C_1$ to $C_4$ alkyl group substituted with $SO_3M$ or COOH); and M represents H, Li, Na, K, ammonium, or an organic amine.]

Furthermore, the present invention also provides magenta ink compositions according to 3 to 19 below, an ink jet recording method according to 20 below, and a recorded article according to 21 below.

3. The magenta ink composition according to 1 or 2 above, wherein the compounds represented by formula (1) and salts thereof are compounds represented by undermentioned formula (4) and salts thereof.

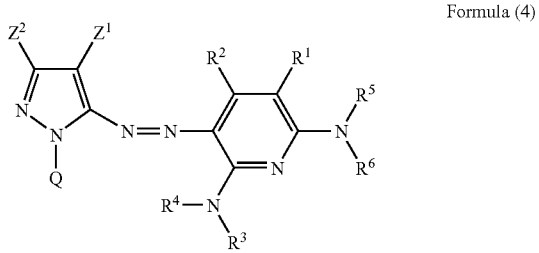

Formula (4)

(In Formula (4), $Z^1$ represents an electron-withdrawing group having a Hammett substituent constant φp value of at least 0.20; $Z^2$ represents a hydrogen atom, an aliphatic group, an aromatic group, or a heterocyclic group; $R^1$, $R^2$, $R^5$ and $R^6$ are defined as in the case of formula (1); $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, a sulfonyl group, or a sulfamoyl group; Q represents a hydrogen atom, an aliphatic group, an aromatic group, or a heterocyclic group; and each of $Z^1$, $Z^2$, $R^1$ to $R^6$, and Q may be further substituted.)

4. The magenta ink composition according to 1 above, containing 0.2 to 2.5 wt % in total of the at least one selected from the compounds represented by formula (1) and salts thereof, and 0.4 to 5.0 wt % in total of the at least one selected from the compounds represented by formula (2) and salts thereof, relative to the total weight of the ink composition.

5. The magenta ink composition according to 2 above, containing 0.3 to 1.5 wt % in total of the at least one selected from the compounds represented by formula (1) and salts thereof, 2.0 to 5.0 wt % in total of the at least one selected from the compounds represented by formula (2) and salts thereof, and 0.5 to 1.5 wt % in total of the at least one selected from the compounds represented by formula (3), relative to the total weight of the ink composition.

6. The magenta ink composition according to 1 above, having a total colorant solid content of 0.6 to 6.0 wt % relative to the total weight of the ink composition.

7. The magenta ink composition according to 2 above, having a total colorant solid content of 3.5 to 5.5 wt % relative to the total weight of the ink composition.

8. The magenta ink composition according to 1 above, wherein the weight ratio of the total content of the at least one selected from the compounds represented by formula (1) and salts thereof to the total content of the at least one selected from the compounds represented by formula (2) and salts thereof is in a range of 3:1 to 1:5.

9. The magenta ink composition according to 1 above, further containing at least one selected from carboxyl group-possessing aromatic compounds and salts thereof.

10. The magenta ink composition according to 2 above, further containing at least one selected from carboxyl group-possessing aromatic compounds and salts thereof.

11. The magenta ink composition according to 9 or 10 above, wherein the carboxyl group-possessing aromatic compounds and salts thereof are aromatic compounds having one carboxyl group and salts thereof.

12. The magenta ink composition according to 9 or 10 above, wherein the carboxyl group-possessing aromatic compounds and salts thereof are naphthalene skeleton-possessing compounds and salts thereof.

13. The magenta ink composition according to 12 above, wherein the naphthalene skeleton-possessing compounds and salts thereof are compounds having a carboxyl group in the 2 position and salts thereof.

14. The magenta ink composition according to 13 above, wherein the naphthalene skeleton-possessing compounds having a carboxyl group in the 2 position and salts thereof are 2-napthoic acid, 3-hydroxy-2-napthoic acid, 6-hydroxy-2-napthoic acid, 6-methoxy-2-napthoic acid, and salts thereof.

15. The magenta ink composition according to 9 or 10 above, wherein the salts of the carboxyl group-possessing aromatic compounds are lithium salts.

16. The magenta ink composition according to 9 above, wherein the weight ratio of the total content of the at least one selected from the compounds represented by formula (1) and salts thereof and the at least one selected from the compounds represented by formula (2) and salts thereof to the total content of the at least one selected from the carboxyl group-possessing aromatic compounds and salts thereof is in a range of 5:1 to 1:3.

17. The magenta ink composition according to 10 above, wherein the weight ratio of the total content of the at least one selected from the compounds represented by formula (1) and salts thereof, the at least one selected from the compounds represented by formula (2) and salts thereof and the at least one selected from the compounds represented by formula (3) and salts thereof to the total content of the at least one selected from the carboxyl group-possessing aromatic compounds and salts thereof is in a range of 5:1 to 1:3.

18. The magenta ink composition according to 1 or 2 above, wherein the magenta ink composition is used in an ink jet recording method.

19. The magenta ink composition according to 18 above, wherein the ink jet recording method is a recording method using an ink jet head that forms ink drops through mechanical deformation of electrostrictive elements.

20. An ink jet recording method, comprising carrying out recording by discharging drops of an ink composition and attaching the drops to a recording medium, wherein the ink jet recording method uses the magenta ink composition according to 1 or 2 above as the ink composition.

21. A recorded article, obtained by recording using the recording method according to 20 above, or using the magenta ink composition according to 1 or 2 above.

Note that 'magenta ink composition' in the present invention includes both a dark magenta ink composition and a light magenta ink composition.

According to an ink composition of the present invention and a recording method using the same, the reliability of the clogging resistance, which is essential for ink jet recording, is high, and moreover there can be provided a recorded article for which a high degree of both light-fastness and gas resistance (ozone resistance) can be realized, and the moisture resistance is also excellent.

Moreover, according to an ink composition of the present invention and a recording method using the same, the colorability of the ink composition, and the reliability of the clogging resistance, which is essential for ink jet recording, are high, and moreover there can be provided a recorded article for which the light-fastness and gas resistance (ozone resistance), and also the moisture resistance are excellent.

DESCRIPTION OF DRAWINGS

EMBODIMENT A

Following is a detailed description of the present invention, showing an embodiment thereof (hereinafter referred to as 'embodiment A').

An ink composition of the present embodiment contains at least the following in water, or an aqueous medium comprising water and water-soluble organic solvents: at least one magenta colorant selected from compounds represented by formula (1) (including salts thereof; mention of this will be omitted hereinafter) and at least one magenta colorant selected from compounds represented by formula (2) (including salts thereof; mention of this will be omitted hereinafter); the ink composition may also be made to contain additives such as humectants, viscosity regulators and pH regulators as necessary.

Compounds represented by formula (1) and compounds represented by formula (2) both have excellent light-fastness and gas resistance, with the compounds represented by formula (1) having particularly good light-fastness, and the compounds represented by formula (2) having particularly good gas resistance. In the present invention, by using these together, a magenta ink composition enabling a high degree of both light-fastness and gas resistance to be realized can be provided.

Compounds represented by formula (1) used in the ink composition of the present invention have an effect of improving the light-fastness and gas resistance, and one such compound may be used alone or a plurality may be used together.

Following is a description of compounds represented by formula (1) that can be used in the present invention.

In general formula 1, A represents the residue of a 5-membered heterocyclic diazo component $A-NH_2$. Examples of each hetero atom in the 5-membered heterocyclic ring are N, O and S. A nitrogen-containing 5-membered heterocyclic ring is preferable, and the heterocyclic ring may have an aliphatic ring, an aromatic ring or another heterocyclic ring fused thereto. Preferable examples of the heterocyclic ring in A are a pyrazole ring, an imidazole ring, a thiazole ring, an isothiazole ring, a thiadiazole ring, a benzothiazole ring, a benzoxazole ring, and a benzisothiazole ring. This heterocyclic group may be further substituted. Out of the above, pyrazole rings, imidazole rings, isothiazole rings, thiadiazole rings and benzothiazole rings as represented by undermentioned general formulae (a) to (f) are preferable.

General Formula

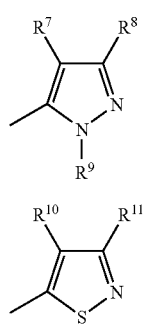

(a)

(b)

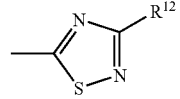

(c)

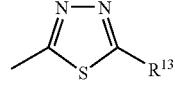

(d)

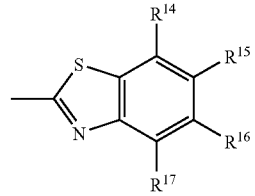

(e)

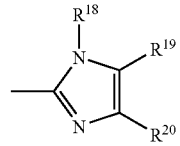

(f)

$R^7$ to $R^{20}$ in general formula (a) to (f) represent substituents as for G, $R^1$ and $R^2$, described later. Out of the heterocyclic rings represented by general formula (a) to (f), pyrazole rings and isothiazole rings represented by general formulae (a) and (b) are preferable, with pyrazole rings represented by general formula (a) being most preferable.

$B^1$ and $B^2$ represent $-CR^1=$ and $-CR^2=$ respectively, or one thereof represents a nitrogen atom and the other thereof represents $-CR^1=$ or $-CR^2=$, with it being more preferable that $B^1$ and $B^2$ represent $-CR^1=$ and $-CR^2=$ respectively.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group, each group being optionally substituted. Preferable substituents represented by $R^5$ or $R^6$ are a hydrogen atom, aliphatic groups, aromatic groups, heterocyclic groups, acyl groups, and alkyl- and aryl-sulfonyl groups, with a hydrogen atom, aromatic groups, heterocyclic groups, acyl groups, and alkyl- and aryl-sulfonyl groups being more preferable, and a hydrogen atom, aryl groups and heterocyclic groups being most preferable. Each such group may be further substituted. Note, however, that $R^5$ and $R^6$ are not both simultaneously a hydrogen atom.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkyl group-, aryl group-, or heterocyclic group-substituted amino group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, a heterocyclic thio group, an alkyl- or aryl-sulfonyl group, an alkylsulfinyl group, an arylsulfinyl group, a sulfamoyl group, or a sulfo group, each group being optionally substituted.

Preferable substituents represented by G are a hydrogen atom, halogen atoms, aliphatic groups, aromatic groups, a hydroxy group, alkoxy groups, aryloxy groups, acyloxy groups, heterocyclic oxy groups, alkyl group-, aryl group-, and heterocyclic group-substituted amino groups, acylamino groups, ureido groups, sulfamoylamino groups, alkoxycarbonylamino groups, aryloxycarbonylamino groups, alkyl- and aryl-thio groups, and heterocyclic thio groups, with a hydrogen atom, halogen atoms, alkyl groups, a hydroxy group, alkoxy groups, aryloxy groups, acyloxy groups, alkyl group-, aryl group-, and heterocyclic group-substituted amino groups, and acylamino groups being more preferable, and out of these a hydrogen atom, arylamino groups and amide groups being most preferable. Each such group may be further substituted.

Preferable substituents represented by $R^1$ or $R^2$ are a hydrogen atom, alkyl groups, alkoxycarbonyl groups, a carboxyl group, carbamoyl groups, and a cyano group. Each such group may further be further substituted. $R^1$ and $R^5$, or $R^5$ and $R^6$ may be bonded together to form a 5- or 6-membered ring. Examples of substituents in the case that any of the substituents represented by A, $R^1$, $R^2$, $R^5$, $R^6$ and G is further substituted are the substituents listed for G, $R^1$ and $R^2$ above.

In the case that an azo dye represented by formula (1) is a water-soluble dye, the azo dye preferably further has ionic hydrophilic groups as substituents in any of the positions on A, $R^1$, $R^2$, $R^5$, $R^6$ or G. Such ionic hydrophilic groups include a sulfo group, a carboxyl group, and a quaternary ammonium group. As such ionic hydrophilic groups, a carboxyl group and a sulfo group are preferable, with a sulfo group being particularly preferable. Such a carboxyl group or sulfo group may be in the form of a salt, with examples of counter ions forming the salt being alkali metal ions (e.g. a sodium ion, a potassium ion, or a lithium ion), an ammonium ion, and organic cations (e.g. a tetramethylammonium or tetramethylguanidium ion).

Following is a detailed description of the substituents represented by G, $R^1$ and $R^2$.

Examples of halogen atoms are a fluorine atom, a chlorine atom, and a bromine atom.

In the present specification, 'aliphatic groups' means alkyl groups, substituted alkyl groups, alkenyl groups, substituted alkenyl groups, alkynyl groups, substituted alkynyl groups, aralkyl groups, and substituted aralkyl groups. Such an aliphatic group may be branched, or may form a ring. The number of carbon atoms in the aliphatic group is preferably 1 to 20, more preferably 1 to 16. The aryl part of an aralkyl group or substituted aralkyl group is preferably phenyl or naphthyl, particularly preferably phenyl. Examples of aliphatic groups include methyl, ethyl, butyl, isopropyl, t-butyl, hydroxyethyl, methoxyethyl, cyanoethyl, trifluoromethyl, 3-sulfopropyl, 4-sulfobutyl, a cyclohexyl group, a benzyl group, a 2-phenethyl group, a vinyl group, and an allyl group.

In the present specification 'aromatic groups' means aryl groups and substituted aryl groups. Preferable aryl groups are phenyl and naphthyl, with phenyl being particularly preferable. The number of carbon atoms in the aromatic group is preferably 6 to 20, more preferably 6 to 16. Examples of aromatic groups include phenyl, p-tolyl, p-methoxyphenyl, o-chlorophenyl, and m-(3-sulfopropylamino)phenyl. 'Heterocyclic groups' include substituted heterocyclic groups and unsubstituted heterocyclic groups.

The heterocyclic ring may have an aliphatic ring, an aromatic ring or another heterocyclic ring fused thereto. The heterocyclic group is preferably a 5- or 6-membered heterocyclic group. Examples of substituents include aliphatic groups, halogen atoms, alkyl- and aryl-sulfonyl groups, acyl groups, acylamino groups, sulfamoyl groups, carbamoyl groups, and ionic hydrophilic groups. Examples of heterocyclic groups include a 2-pyridyl group, a 2-thienyl group, a 2-thiazolyl group, a 2-benzothiazolyl group, a 2-benzoxazolyl group, and a 2-furyl group.

Carbamoyl groups include substituted carbamoyl groups and an unsubstituted carbamoyl group. Examples of substituents include alkyl groups. Examples of carbamoyl groups include a methylcarbamoyl group and a dimethylcarbamoyl group.

Alkoxycarbonyl groups include substituted alkoxycarbonyl groups and unsubstituted alkoxycarbonyl groups. As an alkoxycarbonyl group, one having 2 to 12 carbon atoms is preferable. Examples of substituents include ionic hydrophilic groups. Examples of alkoxycarbonyl groups include a methoxycarbonyl group and an ethoxycarbonyl group.

Aryloxycarbonyl groups include substituted aryloxycarbonyl groups and unsubstituted aryloxycarbonyl groups. As an aryloxycarbonyl group, one having 7 to 12 carbon atoms is preferable. Examples of substituents include ionic hydrophilic groups. Examples of aryloxycarbonyl groups include a phenoxycarbonyl group.

Acyl groups include substituted acyl groups and unsubstituted acyl groups. As an acyl group, one having 1 to 12 carbon atoms is preferable. Examples of substituents include ionic hydrophilic groups. Examples of acyl groups include an acetyl group and a benzoyl group.

Alkoxy groups include substituted alkoxy groups and unsubstituted alkoxy groups. As an alkoxy group, one having 1 to 12 carbon atoms is preferable. Examples of substituents include alkoxy groups, a hydroxy group, and ionic hydrophilic groups. Examples of alkoxy groups include a methoxy group, an ethoxy group, an isopropoxy group, a methoxyethoxy group, a hydroxyethoxy group, and a 3-carboxypropoxy group.

Aryloxy groups include substituted aryloxy groups and unsubstituted aryloxy groups. As an aryloxy group, one having 6 to 12 carbon atoms is preferable. Examples of substituents include alkoxy groups and ionic hydrophilic groups. Examples of aryloxy groups include a phenoxy group, a p-methoxyphenoxy group, and an o-methoxyphenoxy group.

Acyloxy groups include substituted acyloxy groups and unsubstituted acyloxy groups. As an acyloxy group, one having 1 to 12 carbon atoms is preferable. Examples of substituents include ionic hydrophilic groups. Examples of acyloxy groups include an acetoxy group and a benzoyloxy group.

Carbamoyloxy groups include substituted carbamoyloxy groups and an unsubstituted carbamoyloxy group. Examples of substituents include alkyl groups. Examples of carbamoyloxy groups include an N-methylcarbamoyloxy group.

An alkyl group-, aryl group-, or heterocyclic group-substituted amino group substituent may be further substituted. An unsubstituted amino group is not included. As an alkylamino group, one having 1 to 6 carbon atoms is preferable. Examples of substituents include ionic hydrophilic groups. Examples of alkylamino groups include a methylamino group and a diethylamino group. Arylamino groups include substituted arylamino groups and unsubstituted arylamino groups. As an arylamino group, one having 6 to 12 carbon atoms is preferable. Examples of substituents include halogen atoms and ionic hydrophilic groups. Examples of arylamino groups include an analino group and a 2-chloroanalino group.

Acylamino groups include substituted acylamino groups. As an acylamino group, one having 2 to 12 carbon atoms is preferable. Examples of substituents include ionic hydrophilic groups. Examples of acylamino groups include an acetylamino group, a propionylamino group, a benzoylamino group, an N-phenylacetylamino group, and a 3,5-disulfobenzoylamino group.

Ureido groups include substituted ureido groups and an unsubstituted ureido group. As a ureido group, one having 1 to 12 carbon atoms is preferable. Examples of substituents include alkyl groups and aryl groups. Examples of ureido groups include a 3-methylureido group, a 3,3-dimethylureido group, and a 3-phenylureido group.

Sulfamoylamino groups include substituted sulfamoylamino groups and an unsubstituted sulfamoylamino group. Examples of substituents include alkyl groups. Examples of sulfamoylamino groups include an N,N-dipropylsulfamoylamino group.

Alkoxycarbonylamino groups include substituted alkoxycarbonylamino groups and unsubstituted alkoxycarbonylamino groups. As an alkoxycarbonylamino group, one having 2 to 12 carbon atoms is preferable. Examples of substituents include ionic hydrophilic groups. Examples of alkoxycarbonylamino groups include an ethoxycarbonylamino group.

Aryloxycarbonylamino groups include substituted aryloxycarbonylamino groups and unsubstituted aryloxycarbonylamino groups. As an aryloxycarbonylamino group, one having 7 to 12 carbon atoms is preferable. Examples of substituents include ionic hydrophilic groups. Examples of aryloxycarbonylamino groups include a phenoxycarbonylamino group.

Alkyl- and aryl-sulfonylamino groups include substituted alkyl- and aryl-sulfonylamino groups and unsubstituted alkyl- and aryl-sulfonylamino groups. As a sulfonylamino group, one having 1 to 12 carbon atoms is preferable. Examples of substituents include ionic hydrophilic groups. Examples of sulfonylamino groups include a methanesulfonylamino group, an N-phenylmethanesulfonylamino group, a benzenesulfonylamino group, and a 3-carboxybenzenesulfonylamino group.

Alkyl-, aryl- and heterocyclic thio groups include substituted alkyl-, aryl- and heterocyclic thio groups and unsubstituted alkyl-, aryl- and heterocyclic thio groups. As an alkyl-, aryl- or heterocyclic thio group, one having 1 to 12 carbon atoms is preferable. Examples of substituents include ionic hydrophilic groups. Examples of alkyl-, aryl- and heterocyclic thio groups include a methylthio group, a phenylthio group, and a 2-pyridylthio group.

Examples of alkyl- and aryl-sulfonyl groups include a methanesulfonyl group and a phenylsulfonyl group respectively. Examples of alkyl- and aryl-sulfinyl groups include a methanesulfinyl group and a phenylsulfinyl group respectively.

Sulfamoyl groups include substituted sulfamoyl groups and an unsubstituted sulfamoyl group. Examples of substituents include alkyl groups. Examples of sulfamoyl groups include a dimethylsulfamoyl group and a di-(2-hydroxyethyl)sulfamoyl group.

In the present invention, particularly preferable azo dyes are ones represented by formula (4). In the formula, $Z^1$ represents an electron-withdrawing group having a Hammett substituent constant σp value of at least 0.20. $Z^1$ is preferably an electron-withdrawing group having a σp value of 0.30 to 1.0. Specific examples of preferable substituents are the electron-withdrawing substituents mentioned later, but of these, acyl groups having 2 to 12 carbon atoms, alkyloxycarbonyl groups having 2 to 12 carbon atoms, a nitro group, a cyano group, alkylsulfonyl groups having 1 to 12 carbon atoms, arylsulfonyl groups having 6 to 18 carbon atoms, carbamoyl groups having 1 to 12 carbon atoms, and halogenated alkyl groups having 1 to 12 carbon atoms are preferable. A cyano group, alkylsulfonyl groups having 1 to 12 carbon atoms, and arylsulfonyl groups having 6 to 18 carbon atoms are particularly preferable, with a cyano group being most preferable.

$R^1$, $R^2$, $R^5$ and $R^6$ are defined as in the case of formula (1). $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group. Of these, a hydrogen atom, aromatic groups, heterocyclic groups, acyl groups, and alkyl- and aryl-sulfonyl groups are preferable, with a hydrogen atom, aromatic groups and heterocyclic groups being particularly preferable. $Z^2$ represents a hydrogen atom, an aliphatic group, an aromatic group, or a heterocyclic group.

Q represent a hydrogen atom, an aliphatic group, an aromatic group, or a heterocyclic group. Of these, Q is preferably a group comprising a set of non-metallic atoms required to form a 5- to 8-membered ring. This 5- to 8-membered ring may be substituted, and may be a saturated ring or may have unsaturated bonds. Of such groups, aromatic groups and heterocyclic groups are particularly preferable. Preferable non-metallic atoms are nitrogen atoms, oxygen atoms, sulfur atoms and carbon atoms. Specific examples of the 5- to 8-membered ring include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, and a thiane ring.

Each group described for formula (4) may be further substituted. In the case that these groups are further substituted, examples of the substituents are the groups given as examples for substituents, G, $R^1$ and $R^2$ for formula (1), and ionic hydrophilic groups.

Here, regarding the substituent $Z^1$, a description will now be given of the Hammett substituent constant σp value used in the present specification. Hammelt's rule is an empirical rule proposed by L. P. Hammett in 1935 for quantitatively discussing the effects of substituents on the reactions or equilibrium of benzene derivatives, and is accepted as having wide validity even today. As substituent constants determined according to Hammett's rule, there are the σp value and the σm value, and these values can be found in many general compendia, with for example 'Lange's Handbook of Chemistry', 12th edition, 1979, edited by J. A. Dean (McGraw-Hill) and 'Kagaku no Ryoiki', special issue, no. 122, pages 96 to 103, 1979 (Nankodo) being detailed. Note that in the present invention, the substituent is limited and described through the Hammett substituent constant σp, but it goes without saying that this does not mean that the substituent is limited to only ones that can be found in the above compendia, i.e. ones for which there is a known literature value, but rather substituents for which the value may not be known from the literature but would presumably fall within the above range if measured based on Hammett's rule are also included. Moreover, in formulae (1) and (5) in the present invention, compounds other than benzene derivatives are included, but the σp value is still used as an indicator of the electronic effect of the substituent regardless of the substitution site. In the present invention, 'σp value' is used with such a meaning.

Examples of electron-withdrawing groups having a Hammett substituent constant σp value of at least 0.60 include a cyano group, a nitro group, alkylsulfonyl groups (e.g. a methanesulfonyl group), and arylsulfonyl groups (e.g. a benzenesulfonyl group). Examples of electron-withdrawing groups having a Hammett σp value of at least 0.45 include, in addition to the above, acyl groups (e.g. an acetyl group), alkoxycarbonyl groups (e.g. a dodecyloxycarbonyl group), aryloxycarbonyl groups (e.g. m-chlorophenoxycarbonyl), alkylsulfinyl groups (e.g. n-propylsulfinyl), arylsulfinyl groups (e.g. phenylsulfinyl), sulfamoyl groups (e.g. N-ethylsulfamoyl, N,N-dimethylsulfamoyl), and halogenated alkyl groups (e.g. trifluoromethyl).

Examples of electron-withdrawing groups having a Hammett substituent constant σp value of at least 0.30 include, in addition to the above, acyloxy groups (e.g. acetoxy), carbamoyl groups (e.g. N-ethylcarbamoyl, N,N-dibutylcarbamoyl), halogenated alkoxy groups (e.g. trifluoromethyloxy), halogenated aryloxy groups (e.g. pentafluorophenyloxy), sulfonyloxy groups (e.g. a methylsulfonyloxy group), halogenated alkylthio groups (e.g. difluoromethylthio), aryl groups substituted with at least two electron-withdrawing groups having an σp value of at least 0.15 (e.g. 2,4-dinitrophenyl, pentachlorophenyl), and heterocyclic rings (e.g. 2-benzoxazolyl, 2-benzothiazolyl, 1-phenyl-2-benzimidazolyl). Specific examples of electron-withdrawing groups having a σp value of at least 0.20 include, in addition to the above, halogen atoms.

Particularly preferable combinations of substituents in an azo dye represented by formula (1) are as follows.
(i) $R^5$ and $R^6$ are each preferably a hydrogen atom, an alkyl group, an aryl group, a heterocyclic group, a sulfonyl group, or an acyl group, with a hydrogen atom, an aryl group, a heterocyclic group, or a sulfonyl group being more preferable, and a hydrogen atom, an aryl group, or a heterocyclic group being most preferable. Note, however, that $R^5$ and $R^6$ are not both simultaneously a hydrogen atom.
(ii) G is preferably a hydrogen atom, a halogen atom, an alkyl group, a hydroxy group, an amino group, or an amide group, with a hydrogen atom, a halogen atom, an amino group, or an amide group being more preferable, and a hydrogen atom, an amino group, or an amide group being most preferable.

(iii) A is preferably a pyrazole ring, an imidazole ring, an isothiazole ring, a thiadiazole ring, or a benzothiazole ring, with a pyrazole ring or an isothiazole ring being more preferable, and a pyrazole ring being most preferable.
(iv) $B^1$ and $B^2$ are preferably $-CR^1=$ and $-CR^2=$ respectively, and $R^1$ and $R^2$ thereof are each preferably a hydrogen atom, a halogen atom, a cyano group, a carbamoyl group, a carboxyl group, an alkyl group, a hydroxy group, or an alkoxy group, with a hydrogen atom, a cyano group, a carbamoyl group, or an alkyl group being more preferable.

Moreover, regarding preferable combinations of substituents for a compound represented by formula (1), a compound in which at least one of the various substituents is a preferable group as listed above is preferable, a compound in which more of the various substituents are preferable groups as listed above is more preferable, and a compound in which all of the substituents are preferable groups as listed above is most preferable.

A compound represented by formula (1) may be manufactured using any method, but can, for example, be manufactured using a method such as the following.
(a) A compound represented by undermentioned formula (5) and a diazotizing agent are reacted together to form a diazonium salt.
(b) The diazonium salt formed in step (a) above is reacted with a coupling agent represented by undermentioned formula (6), thus forming a compound represented by formula (1).
(c) The compound formed in step (b) above is reacted with an alkylating agent, an arylating agent or a heterylating agent under the presence of a base, thus forming a compound represented by formula (1) having substituents such as alkyl groups introduced therein.

A-NH$_2$ <span style="float:right">Formula (5)</span>

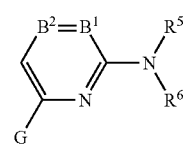

Formula (6)

(In the formula, A, G, $B^1$, $B^2$, $R^5$ and $R^6$ are defined as in the case of formula (1)).

Furthermore, in the case that water-soluble groups are to be introduced into the compound of general formula (1), an electrophilic reaction is used. Examples of the electrophilic reaction are a sulfonation reaction, a Mannich reaction, and a Friedel-Crafts reaction, with a sulfonation reaction being preferable out of these.

Following are specific examples of compounds represented by formula (1) that can be preferably used in the present invention.

TABLE 1
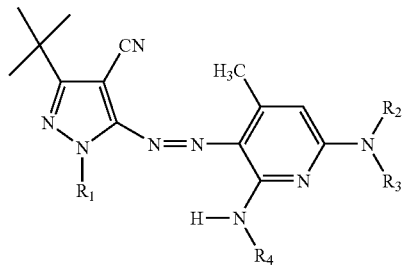
| Dye | R₁ | R₂ |
|---|---|---|
| 1 | 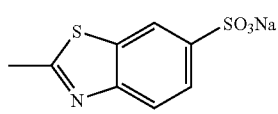 | 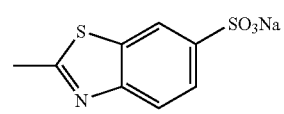 |
| 2 | 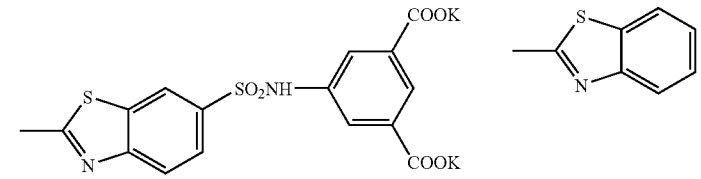 | 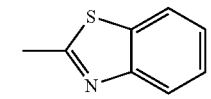 |
| 3 | 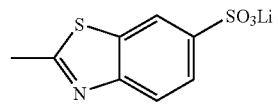 | 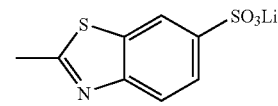 |
| 4 | 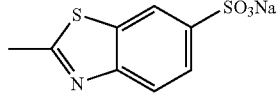 | 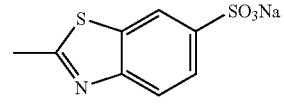 |
| Dye | R₃ | R₄ |
|---|---|---|
| 1 | 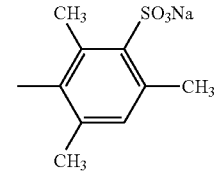 | 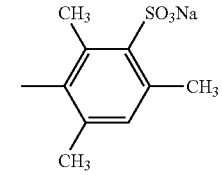 |
| 2 | 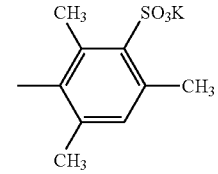 | 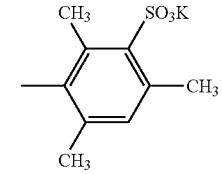 |
| 3 | 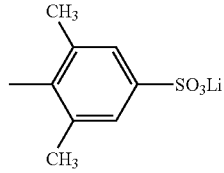 | 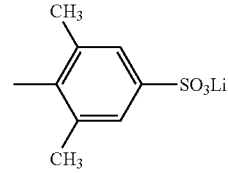 |

TABLE 1-continued

[Structure: pyrazole with tert-butyl, CN, connected via N=N azo to methylpyridine with R₂, R₃ amino groups and H-N-R₄; pyrazole N-R₁]

| 4 | (3,4,5-trimethylbenzyl)-N(CH₂COOH)₂ | (3,4,5-trimethylbenzyl)-N(CH₂COOH)₂ | | |

TABLE 2

[Structure: pyrazole with tert-butyl, CN, connected via N=N azo to methylpyridine bearing NR₂R₃ and H-N-R₄; pyrazole N-R₁]

| Dye | R₁ | R₂ | R₃ | R₄ |
|---|---|---|---|---|
| 5 | 2-benzothiazolyl | 2-benzothiazolyl | 2,3,4,6-tetramethyl-5-SO₃K-phenyl | 2,3,4,6-tetramethyl-5-SO₃K-phenyl |
| 6 | 2-methyl-6-SO₃K-benzothiazolyl | 2-methyl-benzothiazolyl | 2,3,4,6-tetramethyl-5-SO₃K-phenyl | 2,3,4,6-tetramethyl-5-SO₃K-phenyl |
| 7 | 2-methyl-6-methylbenzothiazolyl | 2-methyl-6-SO₃K-benzothiazolyl | 2,3,4,6-tetramethyl-5-SO₃K-phenyl | 2,3,4,6-tetramethyl-5-SO₃K-phenyl |

TABLE 3

| Dye | R₁ | R₂ | R₃ | R₄ |
|-----|----|----|----|----|
| 8 | 2-methylbenzothiazol-6-yl-SO₃K | 2,3,4-trimethylphenyl-6-SO₃K | 2-methylbenzothiazol-6-yl-SO₂K | 2,3,4-trimethylphenyl-6-SO₂K |
| 9 | 2-methylbenzothiazol-6-yl-SO₃Na | 3,4-dimethylphenyl-SO₃Na | 2-methylbenzothiazol-6-yl-SO₂Na | 3,4-dimethylphenyl-SO₃Na |
| 10 | 2-methylbenzothiazol-yl | 3,4,5-trimethylphenyl-SO₃K | 2-methylbenzothiazol-yl | 3,4,5-trimethylphenyl-SO₃K |
| 11 | 2-methylbenzothiazol-yl | 2,3,5,6-tetramethyl-4-SO₃K-phenyl-SO₃K | 2-methylbenzothiazol-yl | 2,3,5,6-tetramethyl-4-SO₃K-phenyl-SO₃K |
| 12 | 2-methyl-5-nitrobenzothiazol-yl | 3-methyl-4-SO₃K-phenyl | 2-methylbenzothiazol-6-yl-SO₃K | 2-methoxy-4-SO₃K-phenyl |

TABLE 4
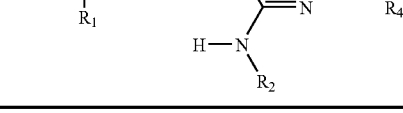
| Dye | R₁ | R₂ |
|---|---|---|
| 13 | 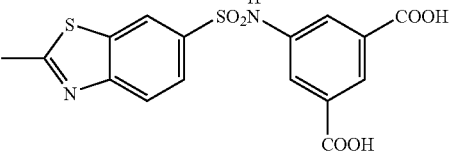 | 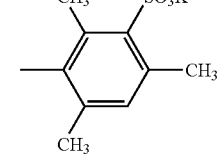 |
| 14 | 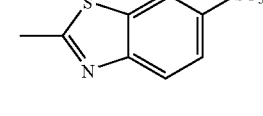 | 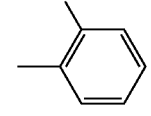 |
| 15 | 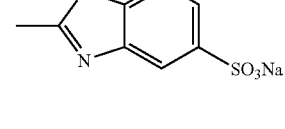 | 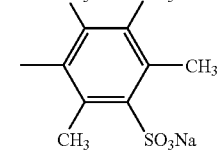 |
| 16 | 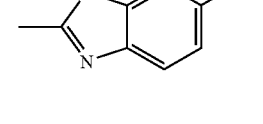 | 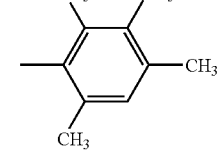 |
| 17 | 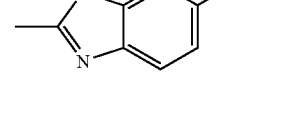 | 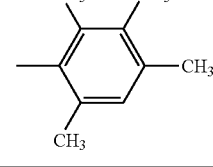 |
| Dye | R₃ | R₄ |
|---|---|---|
| 13 | 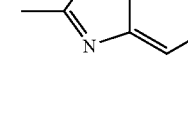 | 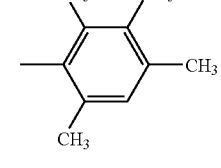 |
| 14 | 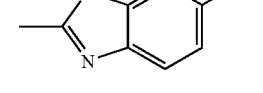 | 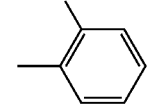 |

TABLE 4-continued

| 14 | (structure: 3-tert-butyl-4-cyano-pyrazole with N-R₁, azo-linked to pyridine bearing 4-CH₃, 3-N=N, 2-NH-R₂, 6-NR₃R₄) | |

| 15 | 2-methyl-benzothiazole-5-SO₃Na | 2,3,4,6-tetramethylbenzene-SO₃Na |
| 16 | 2-methyl-benzothiazole-6-SO₃Li | 2,3,4,6-tetramethylbenzene-SO₃Li |
| 17 | 2-methyl-benzothiazole-6-SO₃H·NH₃ | 2,3,4,6-tetramethylbenzene-SO₃H·NH₃ |

TABLE 5

(isothiazole-4-CN with 3-R₁, 5-azo-linked to pyridine bearing 4-R₂, 3-N=N, 5-R₃, 2-NH-R₆, 6-NR₄R₅)

| Dye | R₁ | R₂ | R₃ | R₄ | R₅ | R₆ |
|-----|-----|-----|-----|-----|-----|-----|
| b-1 | $CH_3$ | H | CN | H | 4-$SO_3Na$-phenyl | 4-$SO_3Na$-phenyl |
| b-2 | $CH_3$ | H | H | $SO_2CH_3$ | 3-methyl-4-$SO_3Na$-phenyl | 3-methyl-4-$SO_3Na$-phenyl |

TABLE 6

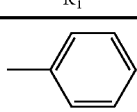

| Dye | $R_1$ | $R_2$ | $R_3$ | $R_4$ | $R_5$ | $R_6$ |
|---|---|---|---|---|---|---|
| c-1 | 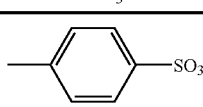 | H | CONH$_2$ | H | 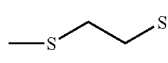 | 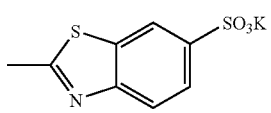 |
| c-2 | 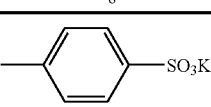 | CH$_3$ | H | 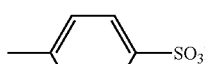 | 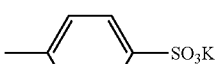 |  |

The total content of the at least one compound of formula (1) is preferably in a range of 0.2 to 2.5 wt %, more preferably 0.3 to 2.0 wt %, relative to the total weight of the ink composition. By making this content be at least 0.2 wt %, the light-fastness and gas resistance can be improved, and by making this content be not more than 2.5 wt %, a drop in the moisture resistance can be prevented.

Compounds represented by formula (2) used in the ink composition of the present invention have an effect of improving the light-fastness and gas resistance, and one such compound may be used alone or a plurality may be used together.

A compound of formula (2) may be manufactured using any method, but can, for example, be manufactured using a method such as the following.

1) Benzoylacetic acid ethyl ester is reacted with 1-methylamino4-bromoanthraquinone in a solvent, thus obtaining 1-benzoyl-6-bromo-2,7-dihydro-3-methyl-2,7-dioxy-3H-dibenz[f,ij]isoquinoline.

2) Next, the compound obtained in 1) above and meta-aminoacetanilide are reacted together in a solvent, thus obtaining 3'-[1-benzoyl-2,7-dihydro-3-methyl-2,7-dioxo-3H-dibenz[f,ij]isoquinolin-6-ylamino]-ace tanilide.

3) Next, the compound obtained in 2) above is reacted in fuming sulfuric acid, thus obtaining trisodium-6-amino-4-[2,7-dihydro-3-methyl-1-(3-sulfonatobenzoyl)-2,7-dioxo-3H-dibenz[f,ij]isoquinolin-6-ylamino]-benzene-1,3-disulfonate.

4) Next, the compound obtained in 3) above and cyanuric chloride are reacted together in water, thus obtaining a primary condensation product, and then reaction is further carried out with a diamine having a connecting group A', thus obtaining a secondary condensation product.

5) Next, the compound obtained in 4) above is taken as is, or is hydrolyzed, or is reacted with ammonia to form a tertiary condensation product, thus obtaining the target compound represented by formula (2).

The total content of the at least one compound of formula (2) is preferably in a range of 0.4 to 5.0 wt %, more preferably 1.0 to 4.0 wt %, relative to the total weight of the ink composition. By making this content be at least 0.4 wt %, the light-fastness and gas resistance can be improved, and by making this content be not more than 5.0 wt %, a drop in the clogging resistance can be prevented.

Moreover, the weight ratio of the total content of the at least one compound represented by formula (1) to the total content of the at least one compound represented by formula (2) is preferably in a range of 3:1 to 1:5, more preferably 2:1 to 1:4. By making the two compounds be contained in such a ratio, a high degree of both light-fastness and ozone resistance can be realized.

Moreover, to adjust the color tone and so on, other magenta dyes can also be used in the magenta ink composition of the present invention, so long as this is within a range such that the various properties such as the light-fastness are not greatly damaged.

Examples of magenta dyes other than compounds represented by formula (1) or (2) include C.I. Direct Reds 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violets 7, 9, 47, 48, 51, 66, 90, 93, 94, 95, 98, 100 and 101, C.I. Acid Reds 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397, C.I. Acid Violets 5, 34, 43, 47, 48, 90, 103 and 126, C.I. Reactive Reds 3, 13, 17, 19, 21, 22, 23, 24, 29, 35, 37, 40, 41, 43, 45, 49 and 55, C.I. Reactive Violets 1, 3, 4, 5, 6, 7, 8, 9, 16, 17, 22, 23, 24, 26, 27, 33 and 34, C.I. Basic Reds 12, 13, 14, 15, 18, 22, 23, 24, 25, 27, 29, 35, 36, 38, 39, 45 and 46, and C.I. Basic Violets 1, 2, 3, 7, 10, 15, 16, 20, 21, 25, 27, 28, 35, 37, 39, 40 and 48.

Moreover, in the magenta ink composition of the present invention, the total colorant (dye) solid content is preferably 0.6 to 6.0 wt % relative to the total weight of the ink composition. By making the total colorant solid content be at least 0.6 wt %, the required colorability (maximum density) can be obtained, and by making the total colorant solid content be not more than 6.0 wt %, clogging when used in an ink set or the like can be prevented.

In the present invention, to improve the moisture resistance, it is preferable to use at least one selected from carboxyl group-possessing aromatic compounds and salts thereof. Any aromatic compound having at least one carboxyl group in the molecular structure thereof or a salt thereof can be used, but the compound preferably has only one carboxyl group, and moreover preferably has a naphthalene skeleton. Moreover, a naphthalene skeleton-possessing compound having a carboxyl group in the 2 position or a salt thereof is more preferable, with an alkali metal salt of a naphthalene skeleton-possessing compound having a carboxyl group in the 2 position being yet more preferable. Of alkali metal salts of a naphthalene skeleton-possessing compound having a carboxyl group in the 2 position, a lithium salt is preferable in terms of clogging resistance.

Specific examples of such carboxyl group-possessing aromatic compounds and salts thereof include 2-hydroxy-1-napthoic acid, 1-hydroxy-2-napthoic acid, 1-napthoic acid, 2-napthoic acid, 3-hydroxy-2-napthoic acid, 6-hydroxy-2-napthoic acid, 3-methoxy-2-napthoic acid, 6-methoxy-2-napthoic acid, 6-ethoxy-2-napthoic acid, 6-propoxy-2-napthoic acid, 4-hydroxybenzoic acid, 2,6-naphthalenedicarboxylic acid, and salts thereof (particularly lithium salts).

A salt of a carboxyl group-possessing aromatic compound may be put into the ink by being added in the form of the salt, or by adding the carboxyl group-possessing aromatic compound and a base separately.

The content of the at least one selected from such carboxyl group-possessing aromatic compounds and salts thereof is set in accordance with the type(s) of the carboxyl group-possessing aromatic compound(s) and/or salt(s) thereof, the types of the dyes, the types of solvent components, and so on, but is preferably in a range of 0.1 to 10 wt %, more preferably 0.5 to 5 wt %, relative to the total weight of the ink composition.

Moreover, the weight ratio of the total content of the at least one selected from compounds represented by formula (1) and salts thereof and the at least one selected from compounds represented by formula (2) and salts thereof to the total content of the at least one selected from carboxyl group-possessing aromatic compounds and salts thereof is preferably in a range of 5:1 to 1:3, more preferably 3:1 to 1:2. By making this ratio be not more than 5:1, a sufficient moisture resistance improvement effect can be obtained, and by making this ratio be at least 1:3, good clogging resistance and so on can be easily secured.

To stably dissolve the prescribed colorants and so on, the pH of the ink composition (at 20° C.) is preferably at least 8.0. Moreover, considering the material resistance for the various members that will come into contact with the ink composition, the pH of the ink composition is preferably not more than 10.5. To satisfy both of these things yet better, the pH of the ink composition is more preferably adjusted to be within a range of 8.5 to 10.0.

In the magenta ink composition of the present invention, as a main solvent, it is preferable to use water or a mixture of water and water-soluble organic solvents.

As the water, ion exchange water, ultra-filtered water, reverse osmosis water, distilled water, or the like can be used. Moreover, from the viewpoint of prolonged storage, water that has been subjected to any of various types of chemical sterilization treatment such as addition of hydrogen peroxide or has been irradiated with ultraviolet rays is preferable.

In the case of using water as the main solvent in the magenta ink composition of the present invention, the content of the water is preferably 40 to 90 wt %, more preferably 50 to 80 wt %, relative to the total weight of the ink composition.

The magenta ink composition of the present invention may further contain at least one humectant selected from saccharides and water-soluble organic solvents having a lower vapor pressure than pure water.

By including a humectant, in ink jet recording, evaporation of water can be suppressed and hence the ink can be prevented from drying up. Moreover, in the case of a water-soluble organic solvent, the discharge stability can be improved, and the viscosity of the ink can easily be changed without changing the ink characteristics.

'Water-soluble organic solvents' refers to media having the ability to dissolve a solute, and are selected from solvents that are organic, are water-soluble, and have a lower vapor pressure than water. Specifically, polyhydric alcohols such as ethylene glycol, propylene glycol, butanediol, pentanediol, 2-butene-1,4-diol, 2-methyl-2,4-pentanediol, glycerol, 1,2,6-hexanetriol, diethylene glycol, triethylene glycol and dipropylene glycol, ketones such as acetonyl acetone, esters such as γ-butyrolactone and triethyl phosphate, furfuryl alcohol, tetrahydrofurfuryl alcohol, thiodiglycol, and so on are preferable.

Moreover, as saccharides, maltitol, sorbitol, gluconolactone, maltose, and so on are preferable.

Such humectants are preferably added in a range of 5 to 50 wt %, more preferably 5 to 30 wt %, yet more preferably 5 to 20 wt %, relative to the total weight of the ink composition. If the amount added is at least 5 wt %, then humectation is obtained, and if the amount added is not more than 50 wt %, then adjustment to a viscosity enabling use in ink jet recording can be carried out easily.

Moreover, the magenta ink composition of the present invention preferably contains a nitrogen-containing organic solvent as a solvent. Examples of such nitrogen-containing organic solvents include 1,3-dimethyl-2-imidazolidinone, 2-pyrrolidone, N-methyl-2-pyrrolidone, and ε-caprolactam, and of these 2-pyrrolidone is preferably used. One such nitrogen-containing organic solvent may be used alone, or two or more may be used together.

The content thereof is preferably 0.5 to 10 wt %, more preferably 1 to 5 wt %, relative to the total weight of the ink composition. By making this content be at least 0.5 wt %, an improvement in the solubility of the colorants of the present invention can be achieved, and by making this content be not more than 10 wt %, there will be no worsening of the material resistance for the various members that will come into contact with the ink composition.

Moreover, the magenta ink composition of the present invention preferably contains a nonionic surfactant, this being as an additive effective for obtaining rapid fixing (penetration) of the ink, and also for maintaining the circularity of the individual dots.

Examples of nonionic surfactants that can be used in the present invention include acetylene glycol type surfactants. Specific examples of acetylene glycol type surfactants include Surfinol 465 and Surfinol 104 (both trade names, made by Air Products and Chemicals Inc.), and Olfine STG and Olfine E1010 (both trade names, made by Nissin Chemical Industry Co., Ltd.). The amount added thereof is preferably 0.1 to 5 wt %, more preferably 0.5 to 2 wt %, relative to the total weight of the ink composition. By making the amount added be at least 0.1 wt %, sufficient penetrability can be obtained, and by making the amount added be not more than 5 wt %, running of images can be easily prevented from occurring.

Furthermore, in addition to a nonionic surfactant, by adding a glycol ether as a penetration promoter, the penetrability can be further increased, and moreover bleeding at interfaces between adjacent color inks in the case of carrying out color printing can be reduced, and hence very sharp images can be obtained.

Examples of glycol ethers that can be used in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount added thereof is preferably 3 to 30 wt %, more preferably 5 to 15 wt %, relative to the total weight of the ink composition. By making the amount added be at least 3 wt %, a sufficient bleeding prevention effect can be obtained, and by making the amount added be not more than 30 wt %, running of images can be easily prevented, and good storage stability of the ink can be easily secured.

Furthermore, the ink composition of the present invention may as required have added thereto pH regulators such as triethanolamine and alkali metal hydroxides, hydrotropic agents such as urea and derivatives thereof, water-soluble polymers such as sodium alginate, water-soluble resins, fluorinated surfactants, preservatives, fungicides, and corrosion inhibitors.

Examples of preservatives and fungicides include sodium benzoate, sodium pentachlorophenol, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN made by Avecia).

Furthermore, examples of pH regulators, dissolution aids and antioxidants include amines such as diethanolamine, triethanolamine, propanolamine and morpholine, and modified compounds thereof, metal hydroxides such as potassium hydroxide, sodium hydroxide and lithium hydroxide, ammonium salts such as ammonium hydroxide and quaternary ammonium hydroxides (e.g. tetramethylammonium hydroxide), carbonates such as potassium carbonate, sodium carbonate and lithium carbonate, and phosphates, and also pyrrolidone compounds such as N-methyl-2-pyrrolidone and 2-pyrrolidone, urea, urea derivatives such as thiourea and tetramethylurea, allophanate compounds such as allophanates and methylallophanates, biuret compounds such as biuret, dimethylbiuret and tetramethylbiuret, and L-ascorbic acid and salts thereof.

In the ink composition of the present invention, the optional components described above may be used alone or a plurality from within the same group or from different groups may be selected and used in combination.

Moreover, in the magenta ink composition of the present invention, the amount of all of the components of the ink composition is preferably selected such that the viscosity of the ink composition is less than 10 mPa.s at 20° C.

Moreover, the magenta ink composition of the present invention preferably has a surface tension at 20° C. of not more than 45 mN/m, more preferably in a range of 25 to 45 mN/m.

An example of a method of preparing the magenta ink composition of the present invention is a method in which the various components are thoroughly mixed together and dissolution is carried out, pressure filtration is carried out using a membrane filter having a pore size of 0.8 μm, and then degassing is carried out using a vacuum pump, thus preparing the magenta ink composition.

Next, a description will be given of a recording method of the present invention using the ink composition described above. As the recording method of the present invention, an ink jet recording method in which the ink composition is discharged as drops from fine holes, and the drops are attached to a recording medium so as to carry out recording can be particularly preferably used, but it goes without saying that the ink composition can also be used with a general writing instrument, a recorder, a pen plotter, or the like.

As the ink jet recording method, any method that has been publicly known from hitherto can be used, but excellent image recording can be carried out in particular with a method in which the drops are discharged using vibration of piezoelectric elements (a recording method using an ink jet head that forms ink drops through mechanical deformation of electrostrictive elements) or a method using thermal energy.

EMBODIMENT B

Next, the present invention will be described in detail, showing another embodiment thereof (hereinafter referred to as 'embodiment B').

An ink composition of the present embodiment contains at least the following in water, or an aqueous medium comprising water and water-soluble organic solvents: at least one magenta colorant selected from compounds represented by formula (1) (including salts thereof; mention of this will be omitted hereinafter), at least one magenta colorant selected from compounds represented by formula (2) (including salts thereof; mention of this will be omitted hereinafter), and at least one magenta colorant selected from compounds represented by formula (3) (including salts thereof; mention of this will be omitted hereinafter); the ink composition may also be made to contain additives such as humectants, viscosity regulators and pH regulators as necessary.

Compounds represented by formula (1) and compounds represented by formula (2) have excellent light-fastness and gas resistance, whereas compounds represented by formula (3) have excellent moisture resistance and colorability. Consequently, by using these together, it becomes possible to secure all of good light-fastness, gas resistance, moisture resistance, colorability and clogging resistance, and in particular by making the contents of the respective compounds be as stated in claim 5, the above properties can be secured with a good balance therebetween.

In the magenta ink composition of embodiment B, as described above, at least one compound represented by formula (1) and at least one compound represented by formula (2), and in addition at least one compound represented by formula (3) are used as magenta colorants. That is, embodiment B is like embodiment A, except that as an indispensable constituent feature, at least one magenta colorant selected from compounds represented by formula (3) is used as a colorant. Consequently, regarding points other than those described in detail below for embodiment B, the matters described earlier for embodiment A apply similarly to embodiment B.

Compounds represented by formula (3) have an effect of improving the colorability and moisture resistance. One selected from the group of compounds represented by formula (3) may be used alone, or a plurality may be used together.

Following are specific examples of compounds represented by formula (3).

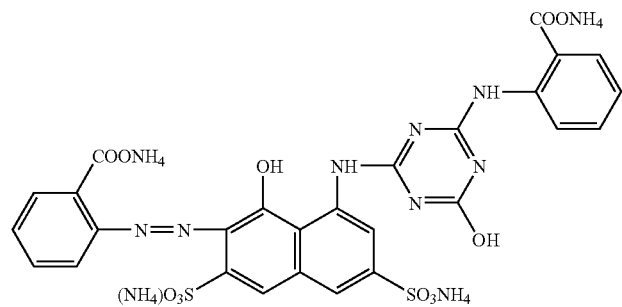
(M-1)
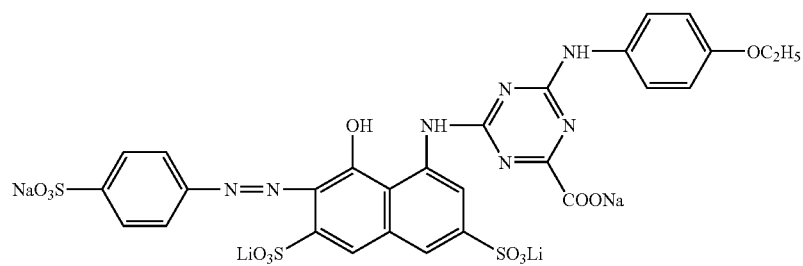
(M-2)
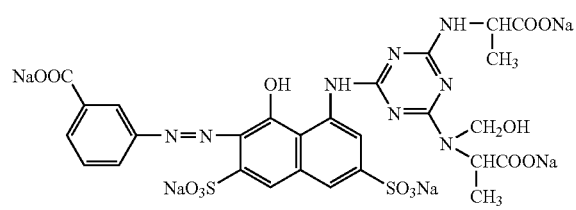
(M-3)
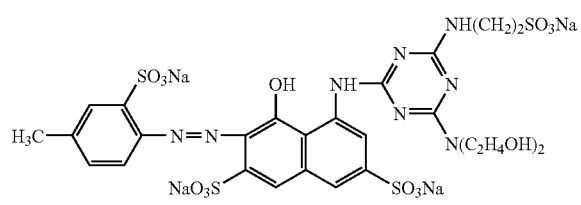
(M-4)
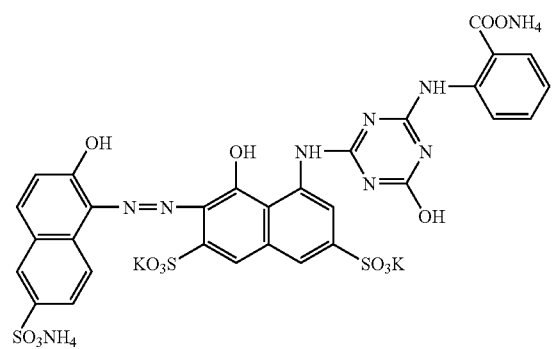
(M-5)
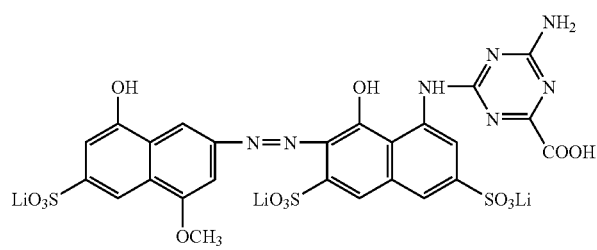
(M-6)

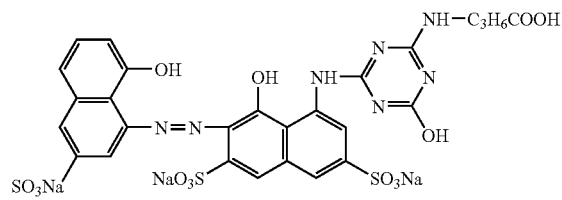

(M-7)

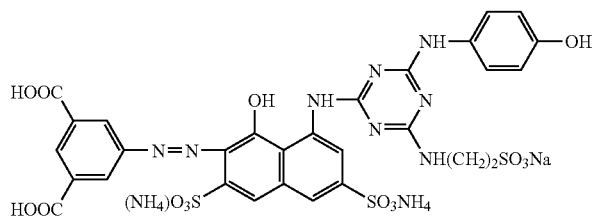

(M-8)

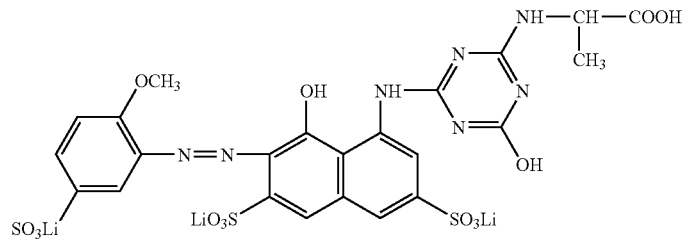

(M-9)

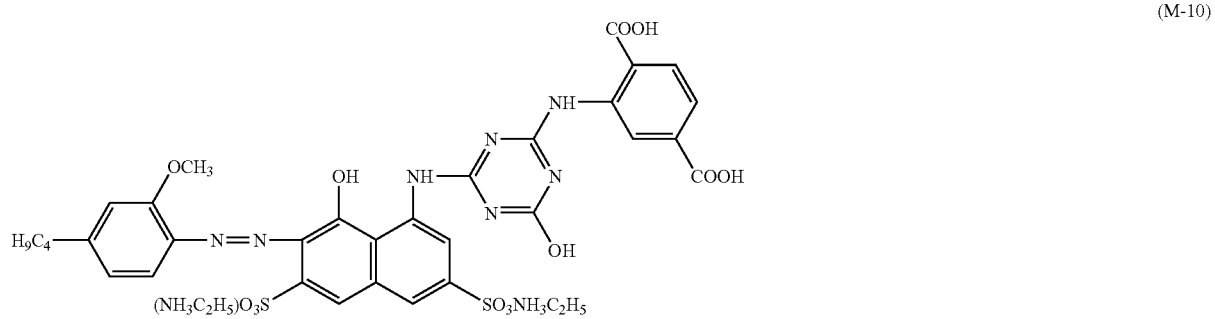

(M-10)

The total content of the at least one compound of formula (3) is preferably in a range of 0.5 to 1.5 wt %, more preferably 0.6 to 1.2 wt %, relative to the total weight of the ink composition. By making this content be at least 0.5 wt %, good colorability can be secured and the moisture resistance can be improved, and by making this content be not more than 1.5 wt %, a drop in the light-fastness and gas resistance can be prevented.

In the magenta ink composition of the present invention, the total colorant (dye) solid content is preferably 3.5 to 5.5 wt % relative to the total weight of the ink composition. By making the total colorant solid content be at least 3.5 wt %, the required colorability (maximum density) can be obtained, and by making the total colorant solid content be not more than 5.5 wt %, clogging when used in an ink set or the like can be prevented.

Moreover, the weight ratio of the total content of the at least one selected from compounds represented by formula (1) and salts thereof, the at least one selected from compounds represented by formula (2) and salts thereof and the at least one selected from compounds represented by formula (3) and salts thereof to the total content of at least one selected from carboxyl group-possessing aromatic compounds and salts thereof is preferably in a range of 5:1 to 1:3, more preferably 3:1 to 1:2. By making this ratio be not more than 5:1, a sufficient moisture resistance improvement effect can be obtained, and by making this ratio be at least 1:3, good clogging resistance and so on can be easily secured.

EXAMPLES

Following is a more specific description of the present invention through examples and comparative examples. Note, however, that the present invention is not limited whatsoever to the materials, compositions and manufacturing methods described in the following examples.

Examples A and Comparative Examples A, and Examples B and Comparative Examples B Using the mixing proportions shown in Table 7 for ink compositions of Examples A1 to A15 and Comparative Examples A1 to A4, and the mixing proportions shown in Table 8 for ink compositions of Examples B1 to B9 and Comparative Examples B1 to B17, the various components were mixed together and dissolution was carried out, and pressure filtration was carried out using a membrane filter having a pore size of 1 μm, thus preparing each ink composition. Here, the structure of compound A is that shown as dye 8 in Table 3 earlier, this being a salt of a compound represented by formula (1). Moreover, the structure of compound B is that shown in undermentioned formula (7), this being a salt of a compound represented by formula (2). Moreover, the structure of compound C is that shown as (M-1) earlier, this being a compound represented by formula (3).

Note that the total colorant solid content for each of the Examples and Comparative Examples is equal to the total of the colorant component proportions in Table 7 or 8.

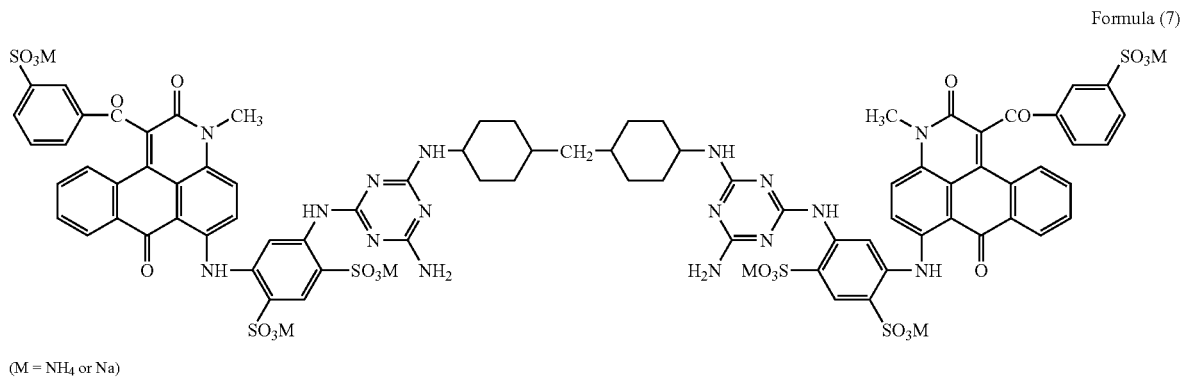

Formula (7)

(M = NH₄ or Na)

TABLE 7

(EXAMPLES A1 TO A15, COMPARATIVE EXAMPLES A1 TO A4)

| | COMPOUND A | COMPOUND B | C.I. Direct Red 227 | C.I. Acid Red 249 | 2-NAPHTHOIC ACID | LiOH•H₂O | NaOH | GLYCEROL | TRIETHYLENE GLYCOL MONOBUTYL ETHER |
|---|---|---|---|---|---|---|---|---|---|
| EXAMPLES 1 | 0.10% | 4.00% | | | | | | 10.0% | 10.0% |
| EXAMPLES 2 | 2.00% | 2.00% | | | | | | 10.0% | 10.0% |
| EXAMPLES 3 | 2.70% | 0.20% | | | | | | 10.0% | 10.0% |
| EXAMPLES 4 | 0.80% | 5.50% | | | | | | 10.0% | 10.0% |
| EXAMPLES 5 | 0.20% | 0.20% | | | | | | 10.0% | 10.0% |
| EXAMPLES 6 | 1.00% | 3.00% | | | | | 0.70% | 10.0% | 10.0% |
| EXAMPLES 7 | 1.50% | 2.00% | | | | | | 10.0% | 10.0% |
| EXAMPLES 8 | 0.50% | 1.00% | | | | | | 10.0% | 10.0% |
| EXAMPLES 9 | 0.70% | 0.80% | | | | | | 10.0% | 10.0% |
| EXAMPLES 10 | 1.00% | 0.50% | | | | | | 10.0% | 10.0% |
| EXAMPLES 11 | 2.70% | 0.20% | | | 3.00% | 0.75% | | 10.0% | 10.0% |
| EXAMPLES 12 | 2.70% | 0.20% | | | 3.00% | | 0.70% | 10.0% | 10.0% |
| EXAMPLES 13 | 1.50% | 2.00% | | | 3.00% | 0.75% | | 10.0% | 10.0% |
| EXAMPLES 14 | 0.70% | 0.80% | | | 3.00% | 0.75% | | 10.0% | 10.0% |
| EXAMPLES 15 | 1.00% | 0.50% | | | 3.00% | 0.75% | | 10.0% | 10.0% |
| COMPARATIVE EXAMPLES 1 | 1.20% | | | | | | | 10.0% | 10.0% |
| COMPARATIVE EXAMPLES 2 | | 2.00% | | | | | | 10.0% | 10.0% |
| COMPARATIVE EXAMPLES 3 | | | 3.00% | | | | | 10.0% | 10.0% |
| COMPARATIVE EXAMPLES 4 | | | | 3.00% | | | | 10.0% | 10.0% |

| | TRIETHYLENE GLYCOL | 2-PYRROLIDONE | TRIETHANOLAMINE | OLFINE E1010 (*1) | PROXEL XL-2 (*2) | ULTRAPURE WATER | TOTAL |
|---|---|---|---|---|---|---|---|
| EXAMPLES 1 | 1.9% | 2.5% | 0.6% | 0.8% | 0.3% | 69.80% | 100% |
| EXAMPLES 2 | 2.0% | 2.5% | 0.6% | 0.8% | 0.3% | 69.80% | 100% |
| EXAMPLES 3 | 3.1% | 2.5% | 0.6% | 0.8% | 0.3% | 69.80% | 100% |
| EXAMPLES 4 | | 2.2% | 0.6% | 0.8% | 0.3% | 69.80% | 100% |
| EXAMPLES 5 | 5.6% | 2.5% | 0.6% | 0.8% | 0.3% | 69.80% | 100% |
| EXAMPLES 6 | 1.3% | 2.5% | 0.6% | 0.8% | 0.3% | 69.80% | 100% |
| EXAMPLES 7 | 2.5% | 2.5% | 0.6% | 0.8% | 0.3% | 69.80% | 100% |
| EXAMPLES 8 | 4.8% | 2.2% | 0.6% | 0.8% | 0.3% | 69.80% | 100% |
| EXAMPLES 9 | 4.5% | 2.5% | 0.6% | 0.8% | 0.3% | 69.80% | 100% |
| EXAMPLES 10 | 4.5% | 2.5% | 0.6% | 0.8% | 0.3% | 69.80% | 100% |
| EXAMPLES 11 | | 1.8% | 0.6% | 0.8% | 0.3% | 69.85% | 100% |
| EXAMPLES 12 | 0.7% | 1.5% | 0.6% | 0.8% | 0.3% | 69.50% | 100% |
| EXAMPLES 13 | | 1.2% | 0.6% | 0.8% | 0.3% | 69.85% | 100% |
| EXAMPLES 14 | 0.7% | 2.5% | 0.6% | 0.8% | 0.3% | 69.85% | 100% |
| EXAMPLES 15 | 0.7% | 2.5% | 0.6% | 0.8% | 0.3% | 69.85% | 100% |
| COMPARATIVE EXAMPLES 1 | 4.8% | 2.5% | 0.6% | 0.8% | 0.3% | 69.80% | 100% |
| COMPARATIVE EXAMPLES 2 | 4.0% | 2.5% | 0.6% | 0.8% | 0.3% | 69.80% | 100% |
| COMPARATIVE EXAMPLES 3 | 3.0% | 2.5% | 0.6% | 0.8% | 0.3% | 69.80% | 100% |

TABLE 7-continued (EXAMPLES A1 TO A15, COMPARATIVE EXAMPLES A1 TO A4)

| | | | | | | | |
|---|---|---|---|---|---|---|---|
| COMPARATIVE EXAMPLES 4 | 3.0% | 2.5% | 0.6% | 0.8% | 0.3% | 69.80% | 100% |

PERCENTAGES IN THE TABLE ARE WT %
(*1) MADE BY NISSIN CHEMINAL INDUSTRY CO., LTD
(*2) MADE BY AVECIA

TABLE 8

(EXAMPLES B1 TO B9, COMPARATIVE EXAMPLES B1 TO B17)

| | COMPOUND A | COMPOUND B | COMPOUND C | C.I. Direct Red 227 | C.I. Acid Red 249 | 2-NAPHTHOIC ACID | LiOH·H₂O | NaOH | GLYCEROL |
|---|---|---|---|---|---|---|---|---|---|
| EXAMPLES 1 | 0.50% | 1.50% | 1.00% | | | | | | 10.0% |
| EXAMPLES 2 | 0.50% | 5.50% | 1.00% | | | | | | 10.0% |
| EXAMPLES 3 | 2.00% | 3.00% | 1.00% | | | | | | 10.0% |
| EXAMPLES 4 | 0.20% | 3.00% | 1.00% | | | | | | 10.0% |
| EXAMPLES 5 | 0.50% | 3.00% | 0.30% | | | | | | 10.0% |
| EXAMPLES 6 | 0.50% | 3.00% | 2.00% | | | | | | 10.0% |
| EXAMPLES 7 | 0.50% | 3.00% | 1.00% | | | | | | 10.0% |
| EXAMPLES 8 | 0.50% | 3.00% | 1.00% | | | 3.00% | | 0.70% | 10.0% |
| EXAMPLES 9 | 0.50% | 3.00% | 1.00% | | | 3.00% | 0.75% | | 10.0% |
| COMPARATIVE EXAMPLES 1 | 3.50% | | | | | | | | 10.0% |
| COMPARATIVE EXAMPLES 2 | 3.50% | | | | | 3.00% | 0.75% | | 10.0% |
| COMPARATIVE EXAMPLES 3 | | 4.50% | | | | | | | 10.0% |
| COMPARATIVE EXAMPLES 4 | | 4.50% | | | | 3.00% | 0.75% | | 10.0% |
| COMPARATIVE EXAMPLES 5 | | | 3.00% | | | | | | 10.0% |
| COMPARATIVE EXAMPLES 6 | | | | 3.00% | | | | | 10.0% |
| COMPARATIVE EXAMPLES 7 | | | | | 3.00% | | | | 10.0% |
| COMPARATIVE EXAMPLES 8 | | | | | 3.00% | 3.00% | 0.75% | | 10.0% |
| COMPARATIVE EXAMPLES 9 | 1.00% | 4.00% | | | | | | | 10.0% |
| COMPARATIVE EXAMPLES 10 | 1.00% | 4.00% | | | | 3.00% | 0.75% | | 10.0% |
| COMPARATIVE EXAMPLES 11 | 1.20% | | 1.20% | | | | | | 10.0% |
| COMPARATIVE EXAMPLES 12 | 1.20% | | 1.20% | | | 3.00% | 0.75% | | 10.0% |
| COMPARATIVE EXAMPLES 13 | | 3.00% | 1.00% | | | | | | 10.0% |
| COMPARATIVE EXAMPLES 14 | 0.50% | 3.00% | | 1.00% | | | | | 10.0% |
| COMPARATIVE EXAMPLES 15 | 0.50% | 3.00% | | 1.00% | | 3.00% | 0.75% | | 10.0% |
| COMPARATIVE EXAMPLES 16 | 0.50% | 3.00% | | | 0.50% | | | | 10.0% |
| COMPARATIVE EXAMPLES 17 | 0.50% | 3.00% | | | 0.50% | 3.00% | 0.75% | | 10.0% |

| | TRIETHYLENE GLYCOL MONOBUTYL ETHER | TRIETHYLENE GLYCOL | 2-PYRROLIDONE | TRIETHANOLAMINE | OLFINE E1010 (*1) | PROXEL XL-2 (*2) | ULTRAPURE WATER | TOTAL |
|---|---|---|---|---|---|---|---|---|
| EXAMPLES 1 | 10.0% | 3.0% | 2.5% | 0.6% | 0.8% | 0.3% | 69.80% | 100% |
| EXAMPLES 2 | 10.0% | | 1.5% | 0.6% | 0.8% | 0.3% | 69.80% | 100% |
| EXAMPLES 3 | 10.0% | | 2.5% | 0.6% | 0.8% | 0.3% | 69.80% | 100% |
| EXAMPLES 4 | 10.0% | 2.0% | 2.5% | 0.6% | 0.8% | 0.3% | 69.80% | 100% |
| EXAMPLES 5 | 10.0% | 2.0% | 2.5% | 0.6% | 0.8% | 0.3% | 69.50% | 100% |
| EXAMPLES 6 | 10.0% | | 2.5% | 0.6% | 0.8% | 0.3% | 69.80% | 100% |
| EXAMPLES 7 | 10.0% | 1.0% | 2.5% | 0.6% | 0.8% | 0.3% | 69.80% | 100% |
| EXAMPLES 8 | 10.0% | | 0.5% | 0.6% | 0.8% | 0.3% | 69.80% | 100% |
| EXAMPLES 9 | 10.0% | | 0.5% | 0.6% | 0.8% | 0.3% | 69.80% | 100% |
| COMPARATIVE EXAMPLES 1 | 10.0% | 2.0% | 2.5% | 0.6% | 0.8% | 0.3% | 69.80% | 100% |
| COMPARATIVE EXAMPLES 2 | 10.0% | | 1.5% | 0.6% | 0.8% | 0.3% | 69.80% | 100% |

TABLE 8-continued (EXAMPLES B1 TO B9, COMPARATIVE EXAMPLES B1 TO B17)

| | | | | | | | | |
|---|---|---|---|---|---|---|---|---|
| COMPARATIVE EXAMPLES 3 | 10.0% | 1.0% | 2.5% | 0.6% | 0.8% | 0.3% | 69.80% | 100% |
| COMPARATIVE EXAMPLES 4 | 10.0% | | 0.5% | 0.6% | 0.8% | 0.3% | 69.80% | 100% |
| COMPARATIVE EXAMPLES 5 | 10.0% | 3.0% | 2.5% | 0.6% | 0.8% | 0.3% | 69.80% | 100% |
| COMPARATIVE EXAMPLES 6 | 10.0% | 3.0% | 2.5% | 0.6% | 0.8% | 0.3% | 69.80% | 100% |
| COMPARATIVE EXAMPLES 7 | 10.0% | 3.0% | 2.5% | 0.6% | 0.8% | 0.3% | 69.80% | 100% |
| COMPARATIVE EXAMPLES 8 | 10.0% | | 1.5% | 0.6% | 0.8% | 0.3% | 69.80% | 100% |
| COMPARATIVE EXAMPLES 9 | 10.0% | 1.0% | 2.5% | 0.6% | 0.8% | 0.3% | 69.80% | 100% |
| COMPARATIVE EXAMPLES 10 | 10.0% | | | 0.6% | 0.8% | 0.3% | 69.80% | 100% |
| COMPARATIVE EXAMPLES 11 | 10.0% | 4.0% | 2.5% | 0.6% | 0.8% | 0.3% | 69.80% | 100% |
| COMPARATIVE EXAMPLES 12 | 10.0% | | 2.5% | 0.6% | 0.8% | 0.3% | 69.80% | 100% |
| COMPARATIVE EXAMPLES 13 | 10.0% | 2.0% | 2.5% | 0.6% | 0.8% | 0.3% | 69.80% | 100% |
| COMPARATIVE EXAMPLES 14 | 10.0% | 1.0% | 2.5% | 0.6% | 0.8% | 0.3% | 69.80% | 100% |
| COMPARATIVE EXAMPLES 15 | 10.0% | | 0.5% | 0.6% | 0.8% | 0.3% | 69.80% | 100% |
| COMPARATIVE EXAMPLES 16 | 10.0% | 2.0% | 2.5% | 0.6% | 0.8% | 0.3% | 69.80% | 100% |
| COMPARATIVE EXAMPLES 17 | 10.0% | | 0.5% | 0.6% | 0.8% | 0.3% | 69.80% | 100% |

PERCENTAGES IN THE TABLE ARE WT %
(*1) MADE BY NISSIN CHEMINAL INDUSTRY CO., LTD
(*2) MADE BY AVECIA

Using an EM930C ink jet printer (made by Seiko Epson Corporation), each of the above ink compositions was filled into a cartridge (magenta chamber) specially for this ink jet printer, and printing was carried out onto a recording medium specially for ink jet recording (PM photographic paper made by Seiko Epson Corporation), and various evaluations were carried out. The results obtained are shown in Tables 9 and 10 (Examples A and Comparative Examples A) and Table 11 (Examples B and Comparative Examples B).

<Light-fastness Test>

Using a cartridge filled with the ink composition of each of the Examples and Comparative Examples, printing was carried out with the print duty adjusted such that the OD (optical density) was in a range of 0.9 to 1.1, and the printed article obtained was exposed for 11 days under conditions of 24° C., a relative humidity (RH) of 60%, and an illumination of 70,000 lux using an STF-II (trade name, made by Suga Test Instruments Co., Ltd.) fluorescent lamp weathering resistance tester.

After the exposure, the optical density of each printed article was measured using a reflection densitometer ('Spectrolino' (trade name) made by Gretag), the relict optical density (ROD) was determined using the following equation, and evaluation was carried out using the following judgement criteria.

$$ROD(\%) = (D/D_0) \times 100$$

D: OD after exposure test $D_0$: OD before exposure test (Measurement conditions: Filter: red, light source: D50, visual field angle: 2°)

[Judgement Criteria for Examples A and Comparative Examples A]

Evaluation 1: ROD at least 90%

Evaluation 2: ROD at least 80% but less than 90%

Evaluation 3: ROD at least 70% but less than 80%

Evaluation 4: ROD at least 60% but less than 70%

Evaluation 5: ROD less than 60%

[Judgement criteria for Examples B and Comparative Examples B]

Evaluation 1: ROD at least 85%

Evaluation 2: ROD at least 70% but less than 85%

Evaluation 3: ROD at least 55% but less than 70%

Evaluation 4: ROD less than 55%

<Evaluation of Gas Resistance (Ozone Resistance)>

Using a cartridge filled with the ink composition of each of the Examples and Comparative Examples, printing was carried out with the print duty adjusted such that the OD (optical density) was in a range of 0.9 to 1.1, and the printed article obtained was exposed for 24 hours under conditions of 24° C., a relative humidity (RH) of 60%, and an ozone concentration of 10 ppm using an OMS—H (trade name, made by Suga Test Instruments Co., Ltd.) ozone weather meter.

After the exposure, the optical density of each printed article was measured using a reflection densitometer ('Spectrolino' (trade name) made by Gretag), the relict optical density (ROD) was determined using the following equation, and evaluation was carried out using the following judgement criteria.

$$ROD(\%) = (D/D_0) \times 100$$

D: OD after exposure test
D₀: OD before exposure test (Measurement conditions: Filter: red, light source: D50, visual field angle: 2°)

[Judgement criteria for Examples A and Comparative Examples A]
Evaluation 1: ROD at least 90%
Evaluation 2: ROD at least 80% but less than 90%
Evaluation 3: ROD at least 70% but less than 80%
Evaluation 4: ROD at least 60% but less than 70%
Evaluation 5: ROD less than 60%

[Judgement criteria for Examples B and Comparative Examples B]
Evaluation 1: ROD at least 85%
Evaluation 2: ROD at least 70% but less than 85%
Evaluation 3: ROD at least 55% but less than 70%
Evaluation 4: ROD less than 55%

<Evaluation of Moisture Resistance>

Using a cartridge filled with the ink composition of each of the Examples and Comparative Examples, characters and reverse characters were printed under discharge conditions such that the firing amount was 1.5 to 2.2 mg per square inch. The printed article obtained was dried for 24 hours at 25° C. and 40% RH, and was then left at 40° C. and 85% RH for 3 days for the ink compositions of Examples A or 7 days for the ink compositions of Examples B and Comparative Examples B; running of the dyes (or collapsing of the reverse characters) was observed visually, and evaluation was carried out using the following judgement criteria.

[Judgement criteria]
Evaluation 1: Running of dyes hardly observed at all.
Evaluation 2: Some running of dyes, outline of characters slightly broken up
Evaluation 3: Running of dyes observed, outline of characters broken up
Evaluation 4: Running of dyes observed, characters thickened, reverse characters filled in
Evaluation 5: Marked running of dyes observed, characters and reverse characters unreadable <Evaluation of Clogging Resistance>

Using a cartridge filled with the ink composition of each of the Examples and Comparative Examples, printing was carried out continuously for 10 minutes, and once it had been confirmed that all of the nozzles were discharging normally, the system was left for 21 days at 60° C. and 15% RH. After this, a cleaning operation was repeated until the nozzles discharged on a par with initially, and evaluation was carried out using the following judgement criteria.

[Judgement criteria]
Evaluation 1: Returns to on a par with initially as soon as the power is turned on or after carrying out the cleaning operation 1 to 4 times
Evaluation 2: Returns to on a par with initially after carrying out the cleaning operation 5 to 8 times
Evaluation 3: Returns to on a par with initially after carrying out the cleaning operation 9 to 12 times
Evaluation 4: Doesn't return to on a par with initially even after carrying out the cleaning operation 13 times <Evaluation of Maximum Density>

Using a cartridge filled with the ink composition of each of Examples B and Comparative Examples B, for each ink composition printing was carried out with the print duty adjusted to maximum. The OD of each sample was then measured using a reflection densitometer ('Spectrolino' (trade name) made by Gretag), and evaluation was carried out using the following judgement criteria.

[Judgement criteria]
Evaluation 1: OD at least 2.2
Evaluation 2: OD at least 2.1 but less than 2.2
Evaluation 3: OD at least 2.0 but less than 2.1
Evaluation 4: OD less than 2.0

<Evaluation of Overall Performance>

For Examples B and Comparative Examples B, the total of the evaluation results for the various items is shown as the overall performance (the lower the value, the better the overall performance).

TABLE 9

(EXAMPLES A1 TO A10, COMPARATIVE EXAMPLES A1 TO A4)

|  | LIGHT-FASTNESS | GAS RESISTANCE |
|---|---|---|
| EXAMPLES 1 | 2 | 1 |
| EXAMPLES 2 | 1 | 1 |
| EXAMPLES 3 | 1 | 2 |
| EXAMPLES 4 | 2 | 1 |
| EXAMPLES 5 | 1 | 1 |
| EXAMPLES 6 | 1 | 1 |
| EXAMPLES 7 | 1 | 1 |
| EXAMPLES 8 | 1 | 1 |
| EXAMPLES 9 | 1 | 1 |
| EXAMPLES 10 | 1 | 1 |
| COMPARATIVE EXAMPLES 1 | 1 | 3 |
| COMPARATIVE EXAMPLES 2 | 3 | 1 |
| COMPARATIVE EXAMPLES 3 | 5 | 5 |
| COMPARATIVE EXAMPLES 4 | 5 | 5 |

TABLE 10

(EXAMPLES A1 TO A15)

|  | MOISTURE RESISTANCE | CLOGGING RESISTANCE |
|---|---|---|
| EXAMPLES 1 | 2 | 1 |
| EXAMPLES 2 | 3 | 1 |
| EXAMPLES 3 | 4 | 1 |
| EXAMPLES 4 | 3 | 2 |
| EXAMPLES 5 | 2 | 1 |
| EXAMPLES 6 | 3 | 1 |
| EXAMPLES 7 | 3 | 1 |
| EXAMPLES 8 | 2 | 1 |
| EXAMPLES 9 | 2 | 1 |
| EXAMPLES 10 | 2 | 1 |
| EXAMPLES 11 | 2 | 1 |
| EXAMPLES 12 | 2 | 2 |
| EXAMPLES 13 | 2 | 1 |
| EXAMPLES 14 | 1 | 1 |
| EXAMPLES 15 | 1 | 1 |

TABLE 11

(EXAMPLES B1 TO B9 AND COMPARATIVE EXAMPLES B1 TO B17)

| | LIGHT-FASTNESS | GAS RESISTANCE | MOISTURE RESISTANCE | CLOGGING RESISTANCE | MAXIMUM DENSITY | OVERALL PERFORMANCE |
|---|---|---|---|---|---|---|
| EXAMPLES 1 | 2 | 2 | 2 | 1 | 2 | 9 |
| EXAMPLES 2 | 2 | 1 | 3 | 3 | 1 | 10 |
| EXAMPLES 3 | 1 | 2 | 3 | 2 | 1 | 9 |
| EXAMPLES 4 | 2 | 2 | 2 | 2 | 2 | 10 |
| EXAMPLES 5 | 1 | 1 | 3 | 1 | 3 | 9 |
| EXAMPLES 6 | 2 | 2 | 2 | 2 | 1 | 9 |
| EXAMPLES 7 | 1 | 1 | 3 | 2 | 1 | 8 |
| EXAMPLES 8 | 1 | 1 | 2 | 3 | 1 | 8 |
| EXAMPLES 9 | 1 | 1 | 2 | 2 | 1 | 7 |
| COMPARATIVE EXAMPLES 1 | 1 | 2 | 5 | 1 | 3 | 12 |
| COMPARATIVE EXAMPLES 2 | 1 | 2 | 5 | 1 | 3 | 12 |
| COMPARATIVE EXAMPLES 3 | 2 | 1 | 4 | 2 | 4 | 13 |
| COMPARATIVE EXAMPLES 4 | 2 | 1 | 3 | 2 | 4 | 12 |
| COMPARATIVE EXAMPLES 5 | 4 | 4 | 1 | 1 | 1 | 11 |
| COMPARATIVE EXAMPLES 6 | 4 | 4 | 1 | 2 | 1 | 12 |
| COMPARATIVE EXAMPLES 7 | 4 | 4 | 5 | 2 | 1 | 16 |
| COMPARATIVE EXAMPLES 8 | 4 | 4 | 5 | 2 | 1 | 16 |
| COMPARATIVE EXAMPLES 9 | 1 | 1 | 5 | 2 | 3 | 12 |
| COMPARATIVE EXAMPLES 10 | 1 | 1 | 4 | 2 | 3 | 11 |
| COMPARATIVE EXAMPLES 11 | 3 | 3 | 4 | 1 | 2 | 13 |
| COMPARATIVE EXAMPLES 12 | 3 | 3 | 3 | 1 | 2 | 12 |
| COMPARATIVE EXAMPLES 13 | 3 | 3 | 2 | 2 | 2 | 12 |
| COMPARATIVE EXAMPLES 14 | 3 | 3 | 3 | 2 | 1 | 12 |
| COMPARATIVE EXAMPLES 15 | 3 | 3 | 2 | 2 | 1 | 11 |
| COMPARATIVE EXAMPLES 16 | 3 | 3 | 5 | 2 | 1 | 14 |
| COMPARATIVE EXAMPLES 17 | 3 | 3 | 5 | 2 | 1 | 14 |

The following are clear from the results in Tables 9 and 10.

For Comparative Examples A1 and A2 in which the compound of formula (1) or the compound of formula (2) was used alone, the light-fastness and the gas resistance were better than for Comparative Examples A3 and A4 in which a conventional dye was used, but yet better light-fastness and gas resistance were exhibited for Examples A1 to A10 in which the compound of formula (1) and the compound of formula (2) were used together. For Examples A2 and A6 to A10 in which the contents of the compound of formula (1) and the compound of formula (2) and the ratio therebetween were made to be within preferable ranges, the light-fastness and gas resistance were further improved. Moreover, for Examples A11 to A15 in which an aromatic carboxylic acid (2-napthoic acid) was used, the moisture resistance was further improved. The clogging resistance was good for all of Examples A.

Moreover, the following are clear from the results in Table 11.

Compared with the Comparative Examples in which compound A, B or C was used alone as a colorant or two thereof were used together (Comparative Examples B1, B3, B5, B9, B11, B13), the overall performance was better for the Examples in which all three were used together (Examples B1 to B7). Moreover, compared with the Comparative Examples in which three dyes were used together including a dye other than compounds of formulae (1) to (3) (Comparative Examples B14, B16), the overall performance was better for the Examples (Examples B1 to B7). For the Example in which the contents of all of the compounds A, B and C were within preferable ranges (Example B7), the overall performance was particularly good.

Moreover, for the Examples in which a carboxyl group-possessing aromatic compound (2-napthoic acid) was used (Examples B8, B9), an improvement in the moisture resistance was further seen.

We claim:

1. A magenta ink composition, containing, as colorants, at least one selected from compounds represented by undermentioned formula (1) and salts thereof, and at least one selected from compounds represented by undermentioned formula (2) and salts thereof;

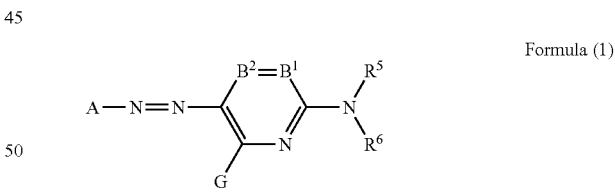

Formula (1)

wherein, in formula (1), A represents a residue of a 5-membered heterocyclic diazo component A-NH$_2$; B$^1$ and B$^2$ represent —CR$^1$═ and —CR$^2$═ respectively, or one thereof represents a nitrogen atom and the other thereof represents —CR$^1$═ or —CR$^2$═; R$^5$ and R$^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, each group being optionally substituted; G, R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkyl group-, aryl group-, or heterocyclic group-substituted amino group, an acylamino group, a ureido group, a sulfamoylamino group, an alkoxycarbonylamino group, an aryloxycarbonylamino group, an alkyl- or aryl-sulfonylamino group, a nitro group, an alkyl-or aryl-thio group, an alkyl- or aryl-sulfonyl group, an alkyl- or aryl-sulfinyl group, a sulfamoyl group, a sulfo group, or a heterocyclic thio group, each group being optionally substituted; and $R^1$ and $R^5$, or $R^5$ and $R^6$ may be bonded together to form a 5- or 6-membered ring;

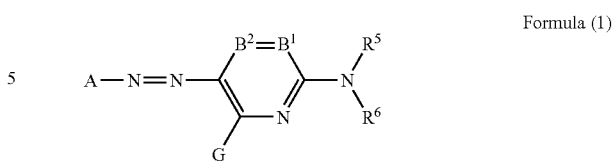

Formula (1)

wherein, in formula (1), A represents a residue of a 5-membered heterocyclic diazo component A-NH$_2$; $B^1$ and $B^2$ represent —CR$^1$= and —CR$^2$= respectively, or one thereof represents a nitrogen atom and the other thereof represents —CR$^1$= or —CR$^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or

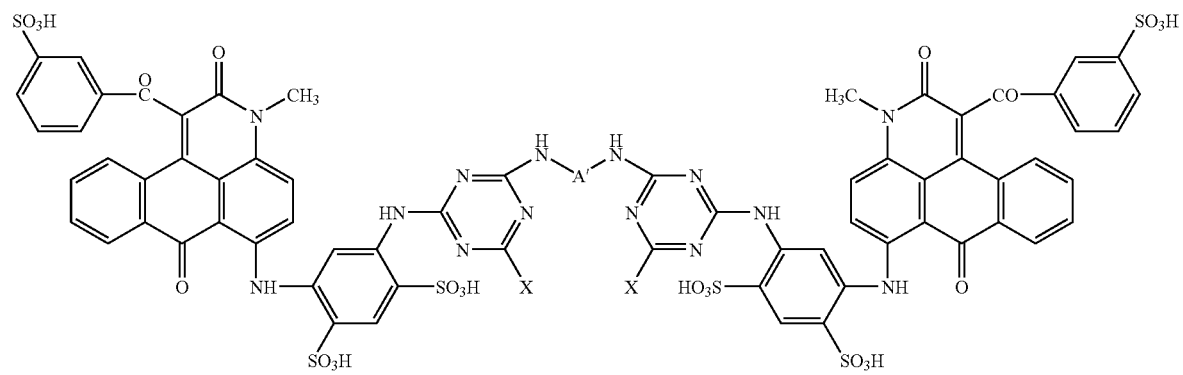

Formula (2)

wherein, in formula (2), $A^1$ represents an alkylene group, a phenylene group-containing alkylene group, or

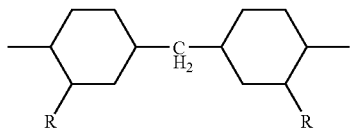

wherein R represents a hydrogen atom or an alkyl group and X represents NH$_2$, OH or Cl.

2. A magenta ink composition, containing as colorants, at least one selected from said compounds represented by formula (1) and salts thereof, at least one selected from said compounds represented by formula (2) and salts thereof, and at least one selected from compounds represented by undermentioned formula (3);

a sulfamoyl group, each group being optionally substituted; G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkyl group-, aryl group-, or heterocyclic group-substituted amino group, an acylamino group, a ureido group, a sulfamoylamino group, an alkoxycarbonylamino group, an aryloxycarbonylamino group, an alkyl- or aryl-sulfonylamino group, a nitro group, an alkyl- or aryl-thio group, an alkyl- or aryl-sulfonyl group, an alkyl- or aryl-sulfinyl group, a sulfamoyl group, a sulfo group, or a heterocyclic thio group, each group being optionally substituted; and $R^1$ and $R^5$, or $R^5$ and $R^6$ may be bonded together to form a 5- or 6-membered ring;

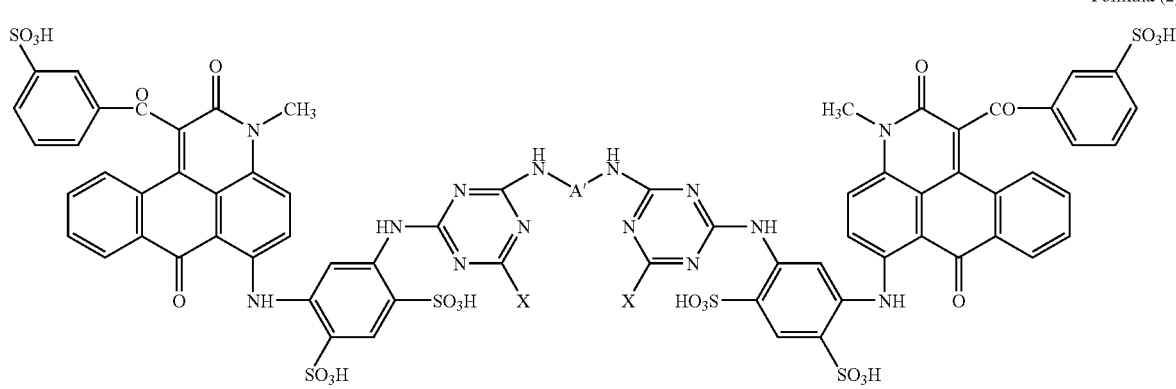

Formula (2)

wherein, in formula (2), $A^1$ represents an alkylene group, a phenylene group-containing alkylene group, or

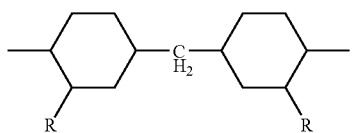

wherein R represents a hydrogen atom or an alkyl group, and X represents $NH_2$, OH or Cl;

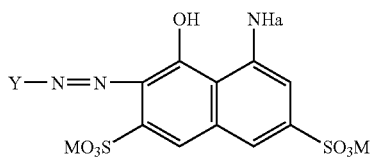

Formula (3)

wherein Y represents a phenyl group or naphthyl group substituted with a $C_1$ to $C_4$ alkyl group or alkoxy group, OH, $SO_3H$ or COOM; B represents H, or the following formula

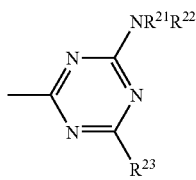

wherein $R^{21}$ represents H or a $C_1$ to $C_4$ alkyl group substituted with OH or COOH, $R^{22}$ represents a $C_1$ to $C_4$ alkyl group or phenyl group substituted with OH, $OCH_3$, $OC_2H_5$, $SO_3M$, or COOM, $R^{23}$ represents OH, COOH, or $NHR^{24}$, and $R^{24}$ represents a $C_1$ to $C_4$ alkyl group substituted with $SO_3M$ or COOH and M represents H, Li, Na, K, ammonium, or an organic amine.

3. The magenta ink composition according to claim 1, wherein said compounds represented by formula (1) and salts thereof are compounds represented by undermentioned formula (4) and salts thereof;

Formula (4)

wherein $Z^1$ represents an electron-withdrawing group having a Hammett substituent constant p value of at least 0.20; $Z^2$ represents a hydrogen atom, an aliphatic group, an aromatic group, or a heterocyclic group; $R^1$, $R^2$, $R^5$ and $R^6$ are defined as in the case of formula (1); $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, a sulfonyl group, or a sulfamoyl group; Q represents a hydrogen atom, an aliphatic group, an aromatic group, or a heterocyclic group; and each of $Z^1$, $Z^2$, $R^1$ to $R^6$, and Q may be further substituted.

4. The magenta ink composition according to claim 1, containing 0.2 to 2.5 wt % in total of the at least one selected from said compounds represented by formula (1) and salts thereof, and 0.4 to 5.0 wt % in total of the at least one selected from said compounds represented by formula (2) and salts thereof, relative to the total weight of the ink composition.

5. The magenta ink composition according to claim 2, containing 0.3 to 1.5 wt % in total of the at least one selected from said compounds represented by formula (1) and salts thereof, 2.0 to 5.0 wt % in total of the at least one selected from said compounds represented by formula (2) and salts thereof, and 0.5 to 1.5 wt % in total of the at least one selected from said compounds represented by formula (3), relative to the total weight of the ink composition.

6. The magenta ink composition according to claim 1, having a total colorant solid content of 0.6 to 6.0 wt % relative to the total weight of the ink composition.

7. The magenta ink composition according to claim 2, having a total colorant solid content of 3.5 to 5.5 wt % relative to the total weight of the ink composition.

8. The magenta ink composition according to claim 1, wherein the weight ratio of the total content of the at least one selected from said compounds represented by formula (1) and salts thereof to the total content of the at least one selected from said compounds represented by formula (2) and salts thereof is in a range of 3:1 to 1:5.

9. The magenta ink composition according to claim 1, further containing at least one selected from carboxyl group-possessing aromatic compounds and salts thereof.

10. The magenta ink composition according to claim 2, further containing at least one selected from carboxyl group-possessing aromatic compounds and salts thereof.

11. The magenta ink composition according to claim 9, wherein said carboxyl group-possessing aromatic compounds and salts thereof are aromatic compounds having one carboxyl group and salts thereof.

12. The magenta ink composition according to claim 9, wherein said carboxyl group-possessing aromatic compounds and salts thereof are naphthalene skeleton-possessing compounds and salts thereof.

13. The magenta ink composition according to claim 12, wherein said naphthalene skeleton-possessing compounds and salts thereof are compounds having a carboxyl group in the 2 position and salts thereof.

14. The magenta ink composition according to claim 13, wherein said naphthalene skeleton-possessing compounds having a carboxyl group in the 2 position and salts thereof are 2-napthoic acid, 3-hydroxy-2-napthoic acid, 6-hydroxy-2-napthoic acid, 6-methoxy-2-napthoic acid, and salts thereof.

15. The magenta ink composition according to claim 9, wherein the salts of said carboxyl group-possessing aromatic compounds are lithium salts.

16. The magenta ink composition according to claim 9, wherein the weight ratio of the total content of the at least one selected from said compounds represented by formula (1) and salts thereof and the at least one selected from said compounds represented by formula (2) and salts thereof to the total content of the at least one selected from said carboxyl group-possessing aromatic compounds and salts thereof is in a range of 5:1 to 1:3.

17. The magenta ink composition according to claim 10, wherein the weight ratio of the total content of the at least one selected from said compounds represented by formula (1) and salts thereof, the at least one selected from said compounds represented by formula (2) and salts thereof and the at least one selected from said compounds represented by formula (3) and salts thereof to the total content of the at least one selected from said carboxyl group-possessing aromatic compounds and salts thereof is in a range of 5:1 to 1:3.

18. An ink jet recording method comprising (a) providing the magenta ink composition according to claim 1, and discharging drops of the magenta ink composition onto a recording medium.

19. The magenta ink composition according to claim 18, wherein said ink jet recording method is a recording method comprising an ink jet head that forms ink drops through mechanical deformation of electrostrictive elements.

20. An ink jet recording method, comprising carrying out recording by discharging drops of the magenta ink composition of claim 1 and attaching the drops to a recording medium.

21. A recorded article, obtained by the recording method according to claim 20.

22. The magenta ink composition according to claim 1, wherein the compounds represented by formulas (I) and (II) and salts thereof are present in the magenta ink composition in respective amounts sufficient to provide the magenta ink composition with a light fastness or gas resistance that is improved as compared with the magenta ink composition comprising the compound of formula (I) or the compound of formula (II) only.

* * * * *